United States Patent
Yamada

(10) Patent No.: US 11,184,498 B2
(45) Date of Patent: Nov. 23, 2021

(54) IMAGE FORMING APPARATUS

(71) Applicant: KYOCERA Document Solutions Inc., Osaka (JP)

(72) Inventor: Yohei Yamada, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/130,360

(22) Filed: Dec. 22, 2020

(65) Prior Publication Data
US 2021/0195044 A1 Jun. 24, 2021

(30) Foreign Application Priority Data
Dec. 24, 2019 (JP) .............................. JP2019-233372

(51) Int. Cl.
*H04N 1/00* (2006.01)

(52) U.S. Cl.
CPC ....... *H04N 1/00803* (2013.01); *H04N 1/0057* (2013.01); *H04N 1/00809* (2013.01)

(58) Field of Classification Search
CPC .... G06F 13/4063; G06F 16/94; G06F 40/114; G06F 16/322; G06F 16/40; G06F 16/748; G06F 40/258; G06F 16/248; G06F 16/958; Y10S 707/99945; Y10S 707/99948; H04N 1/0057; H04N 1/00803; H04N 1/00809
USPC ......................................................... 358/474
See application file for complete search history.

(56) References Cited

U.S. PATENT DOCUMENTS

| | | | | |
|---|---|---|---|---|
| 8,953,225 B2* | 2/2015 | Yamada | ............. | H04N 1/00737 358/448 |
| 8,970,898 B2* | 3/2015 | Yamashita | ......... | H04N 1/00968 358/1.2 |
| 2006/0156226 A1* | 7/2006 | Dejean | .................. | G06F 40/114 715/251 |
| 2009/0122358 A1* | 5/2009 | Moore | ............... | H04N 1/00965 358/473 |
| 2016/0165089 A1* | 6/2016 | Goto | ........................ | H04N 1/60 358/1.16 |
| 2016/0182396 A1* | 6/2016 | Kaul | .................... | H04L 49/3018 370/356 |
| 2018/0007222 A1* | 1/2018 | Yamada | ............... | H04N 1/0032 |
| 2021/0160391 A1* | 5/2021 | Yamada | ............. | H04N 1/00803 |

FOREIGN PATENT DOCUMENTS

JP  2007-221246  8/2007

\* cited by examiner

*Primary Examiner* — Negussie Worku
(74) *Attorney, Agent, or Firm* — Lex IP Meister, PLLC

(57) ABSTRACT

An image forming apparatus extracts a pagination image from original document image data of each of a plurality of original documents, specifies a last-digit image corresponding to the ones place of a pagination, arrays a plurality of pagination images in a reading order of original documents beginning with an original document earliest read to form a matrix with n rows and ten columns, sets a row including ten different last-digit images as a reference row, sets a row after the reference row as a first check row, determines, in order from a first column, whether a pagination image of the first check row is a first subject pagination image differing in last-digit image from a pagination image in the identical column of the reference row, and, if determining that some pagination image or another is the first subject pagination image, determines that multi feed has occurred.

12 Claims, 13 Drawing Sheets

FIG. 9

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | 2 | 3 | 4 | 5 | 6 | 7 | 8 | 9 | 10 |
| ROW 2 | 11 | 12 | 13 | 14 | 15 | 16 | 17 | 18 | 19 | 20 |
| ROW 3 | 21 | 22 | 23 | 24 | 25 | 26 | 27 | 28 | 29 | 30 |
| ROW 4 | 31 | 32 | 33 | 34 | 35 | 36 | 37 | 38 | 39 | 40 |

FIG. 10

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | 2 | 3 | 4 | 5 | 6 | 7 | 8 | 9 | 10 |
| ROW 2 | 11 | 12 | 13 | 14 | 15 | 16 | 17 | 18 | 19 | 20 |
| ROW 3 | 21 | 22 | 23 | 24 | 25 | 27 | 28 | 29 | 30 | 31 |
| ROW 4 | 32 | 33 | 34 | 35 | 36 | 37 | 38 | 39 | 40 |  |

FIG. 11

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | 2 | 3 | 4 | 5 | 7 | 8 | 9 | 10 | 11 |
| ROW 2 | 12 | 13 | 14 | 15 | 16 | 17 | 18 | 19 | 20 | 21 |
| ROW 3 | 22 | 23 | 24 | 25 | 26 | 27 | 28 | 29 | 30 | 31 |
| ROW 4 | 32 | 33 | 34 | 35 | 36 | 37 | 38 | 39 | 40 |  |

BEFORE FIRST CHANGE PROCESS

↓

AFTER FIRST CHANGE PROCESS

FIG. 15

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | ②← | ③← | ④← | ⑤ | 7 | 8 | 9 | 10 | 11 |
| ROW 2 | 12 | 13 | 14 | 15 | (16) | 17 | 18 | 19 | 20 | 21 |
| ROW 3 | 22 | 23 | 24 | 25 | 26 | 27 | 28 | 29 | 30 | 31 |
| ROW 4 | 32 | 33 | 34 | 35 | 36 | 37 | 38 | 39 | 40 | |

BEFORE SECOND CHANGE PROCESS

↓

| | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 2 | 3 | 4 | 5 | 16 | 7 | 8 | 9 | 10 | 11 |
| ROW 2 | 12 | 13 | 14 | 15 | 16 | 17 | 18 | 19 | 20 | 21 |
| ROW 3 | 22 | 23 | 24 | 25 | 26 | 27 | 28 | 29 | 30 | 31 |
| ROW 4 | 32 | 33 | 34 | 35 | 36 | 37 | 38 | 39 | 40 | |

AFTER SECOND CHANGE PROCESS

FIG. 16

|      | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|------|----------|----------|----------|----------|----------|----------|----------|----------|----------|-----------|
| ROW 1 | 1 | 2 | 3 | 4 | 5 | 8 | 9 | 10 | 11 | 12 |
| ROW 2 | 13 | 14 | 15 | 16 | 17 | 18 | 19 | 20 | 21 | 22 |
| ⋮ | ⋮ | ⋮ | ⋮ | ⋮ | ⋮ | ⋮ | ⋮ | ⋮ | ⋮ | ⋮ |

FIG. 17

|      | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|------|----------|----------|----------|----------|----------|----------|----------|----------|----------|-----------|
| ROW 1 | 1 | 2 | 3 | 4 | 5 | 6 | 7 | 8 | 9 | 10 |
| ROW 2 | 11 | 12 | 13 | 16 | 17 | 18 | 19 | 20 | 21 | 22 |
| ⋮ | ⋮ | ⋮ | ⋮ | ⋮ | ⋮ | ⋮ | ⋮ | ⋮ | ⋮ | ⋮ |

FIG. 18

|      | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|------|----------|----------|----------|----------|----------|----------|----------|----------|----------|-----------|
| ROW 1 | 1 | 2 | 3 | 4 | 5 | 6 | 7 | 8 | 9 | 10 |
| ROW 2 | 11 | 12 | 13 | 14 | 17 | 18 | 19 | 20 | 21 | 22 |
| ⋮ | ⋮ | ⋮ | ⋮ | ⋮ | ⋮ | ⋮ | ⋮ | ⋮ | ⋮ | ⋮ |

FIG. 19

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | 2 | 3 | 6 | 7 | 8 | 9 | 10 | 11 | 12 |
| ROW 2 | 13 | 14 | 15 | 16 | 17 | 18 | 19 | 20 | 21 | 22 |
| ⋮ | ⋮ | ⋮ | ⋮ | ⋮ | ⋮ | ⋮ | ⋮ | ⋮ | ⋮ | ⋮ |

FIG. 20

|  | COLUMN 1 | COLUMN 2 | COLUMN 3 | COLUMN 4 | COLUMN 5 | COLUMN 6 | COLUMN 7 | COLUMN 8 | COLUMN 9 | COLUMN 10 |
|---|---|---|---|---|---|---|---|---|---|---|
| ROW 1 | 1 | 2 | 3 | 4 | 7 | 8 | 9 | 10 | 11 | 12 |
| ROW 2 | 13 | 14 | 15 | 16 | 17 | 18 | 19 | 20 | 21 | 22 |
| ⋮ | ⋮ | ⋮ | ⋮ | ⋮ | ⋮ | ⋮ | ⋮ | ⋮ | ⋮ | ⋮ |

IMAGE FORMING APPARATUS

INCORPORATION BY REFERENCE

This application is based upon, and claims the benefit of priority from, corresponding Japanese Patent Application No. 2019-233372 filed in the Japan Patent Office on Dec. 24, 2019, the entire contents of which are incorporated herein by reference.

BACKGROUND

Field of the Invention

The present disclosure relates to an image forming apparatus that conveys and reads an original document.

Description of Related Art

On an image forming apparatus that performs reading of an original document, an original document conveyance section to automatically convey an original document toward a reading position may be provided. If a plurality of original documents are to be read, a bundle of original documents is (that is to say, two or more original documents are) set on the original document conveyance section. The original document conveyance section sequentially conveys the original documents of the set bundle toward the reading position. The image forming apparatus sequentially reads the original documents conveyed to the reading position.

SUMMARY

An image forming apparatus according to an embodiment of the present disclosure includes an original document conveyance section configured to sequentially convey original documents set toward a reading position, an image reading section configured to sequentially read the original documents conveyed to the reading position, and a controller configured to sequentially acquire original document image data obtained upon reading of the original documents by the image reading section. The controller extracts a pagination image including an image corresponding to a pagination imparted to an original document from the original document image data of each of a plurality of original documents read by the image reading section, and specifies a last-digit image in the pagination image for each pagination image, the last-digit image corresponding to a ones place of the pagination. The controller arrays a plurality of pagination images in a reading order of original documents corresponding to the original document image data as an extraction source of the plurality of pagination images, the reading order beginning with an original document earliest read, to form a matrix with n rows and ten columns, sets one row of the matrix that includes ten different last-digit images as a reference row, and sets a row after the reference row as a first check row. The controller starts a first determination process on pagination images in respective columns of the first check row, the first determination process being for determining, in order from a first column, whether or not a pagination image of the first check row is a first subject pagination image that differs in last-digit image from a pagination image in an identical column of the reference row. If determining that one of the pagination images of the first check row is the first subject pagination image, the controller determines that multi feed has occurred during reading of a first original document that is an original document last read before an original document corresponding to the original document image data as an extraction source of the first subject pagination image.

BRIEF DESCRIPTION OF THE DRAWINGS

FIG. 9 is a diagram illustrating a matrix (matrix without multi feed having occurred) that is formed by the controller in the multifunction peripheral according to an embodiment of the present disclosure;

FIG. 10 is a diagram illustrating a matrix (matrix with multi feed having occurred) that is formed by the controller in the multifunction peripheral according to an embodiment of the present disclosure;

FIG. 11 is a diagram illustrating a matrix (matrix with multi feed having occurred) that is formed by the controller in the multifunction peripheral according to an embodiment of the present disclosure;

FIG. 15 is a diagram for explaining a second change process executed by the controller in the multifunction peripheral according to an embodiment of the present disclosure;

FIG. 16 is a diagram illustrating a matrix (matrix with two original documents having been superposed on a given original document) that is formed by the controller in the multifunction peripheral according to an embodiment of the present disclosure;

FIG. 17 is a diagram illustrating a matrix (matrix in the case of double-sided reading) that is formed by the controller in the multifunction peripheral according to an embodiment of the present disclosure;

FIG. 18 is a diagram illustrating a matrix (matrix in the case of double-sided reading) that is formed by the controller in the multifunction peripheral according to an embodiment of the present disclosure;

FIG. 19 is a diagram illustrating a matrix (matrix in the case of double-sided reading) that is formed by the controller in the multifunction peripheral according to an embodiment of the present disclosure; and FIG. 20 is a diagram illustrating a matrix (matrix in the case of double-sided reading) that is formed by the controller in the multifunction peripheral according to an embodiment of the present disclosure.

DETAILED DESCRIPTION

Figure 1:
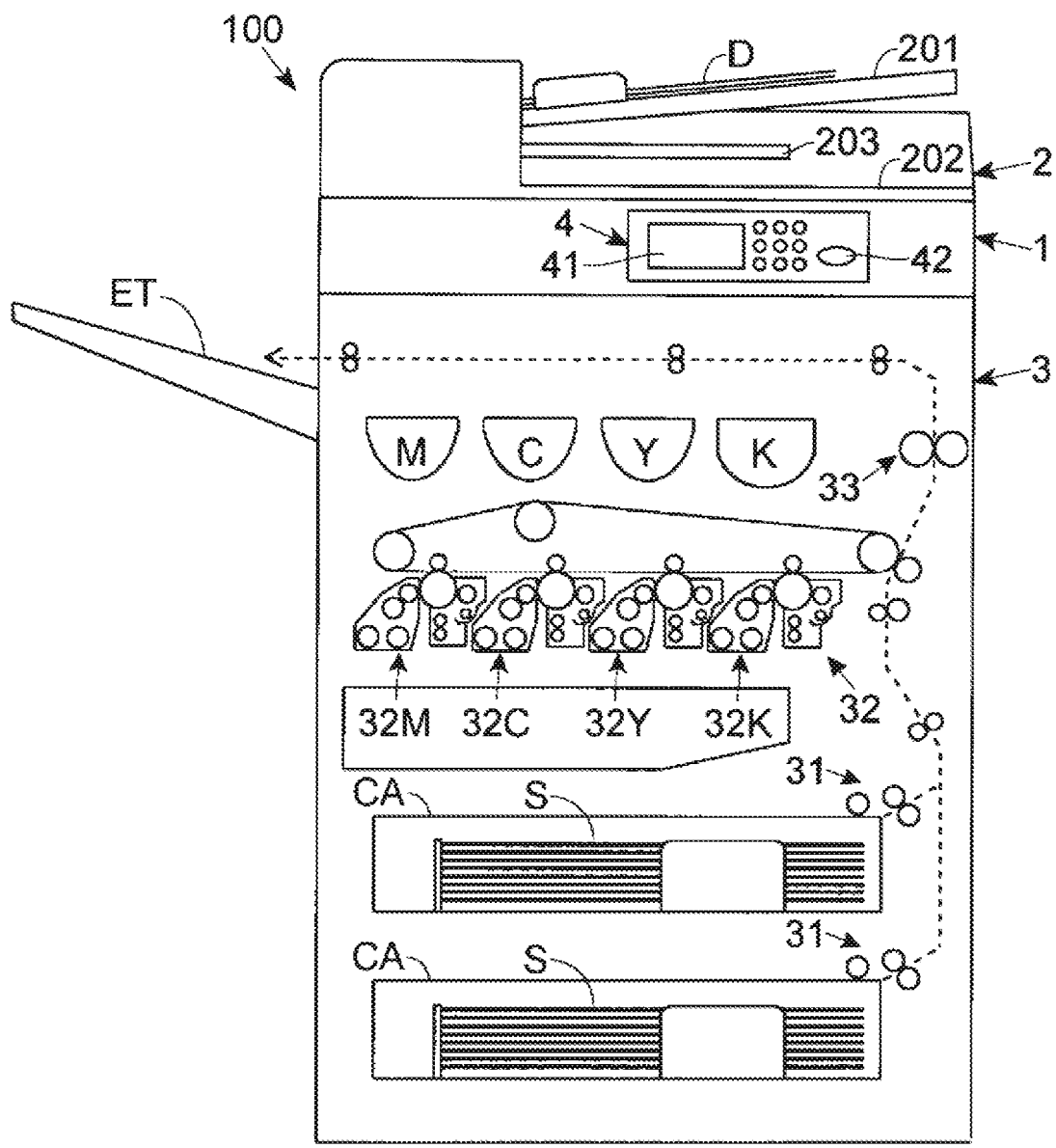
FIG. 1 is a schematic diagram illustrating a general configuration of a multifunction peripheral according to an embodiment of the present disclosure.

The following description is made on an image forming apparatus according to an embodiment of the present disclosure that is exemplified by a multifunction peripheral.
Configuration of Multifunction Peripheral As illustrated in FIG. 1, a multifunction peripheral 100 according to the present embodiment includes an image reading section 1. On a housing of the image reading section 1, an original document conveyance unit 2 is provided. The original document conveyance unit 2 refers to an original document conveyance section.

Figure 2:
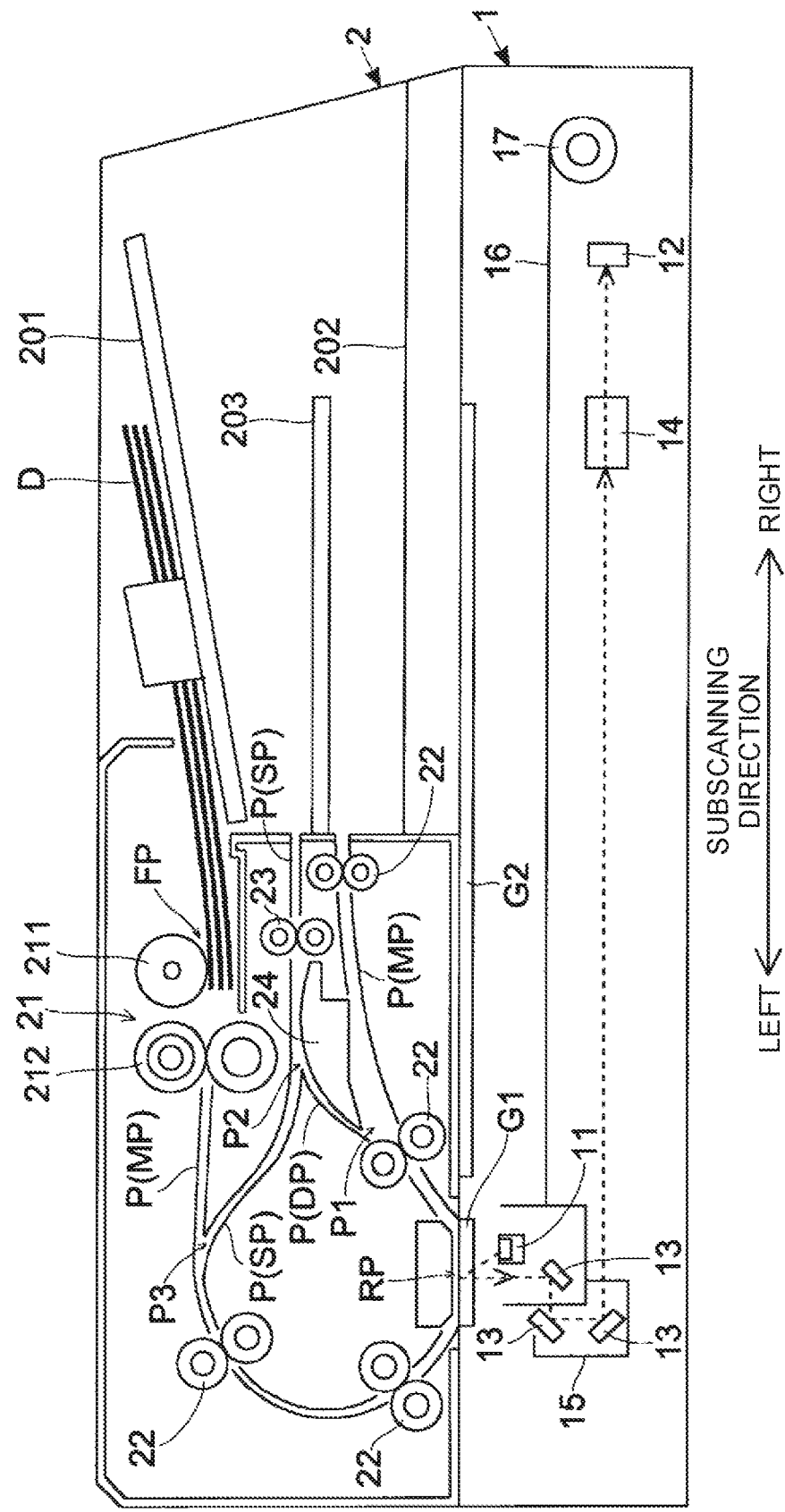
FIG. 2 is a diagram illustrating configurations of an image reading section and an original document conveyance unit of the multifunction peripheral according to an embodiment of the present disclosure.

The image reading section 1 and the original document conveyance unit 2 each have a configuration illustrated in FIG. 2. The image reading section 1 reads an original document D and generates original document image data corresponding to the read original document D. The image reading section 1 performs reading of conveyed documents or placed documents.

In the reading of conveyed documents, the original document D is automatically conveyed toward a contact glass G1 for the reading of conveyed documents, and the reading of the original document D by the image reading section 1 is carried out when the original document D passes over the contact glass G1. In the reading of placed documents, the image reading section 1 reads the original document D placed on a contact glass G2 for the reading of placed documents.

The image reading section 1 includes a light source 11, an image sensor 12, mirrors 13, and a lens 14. The light source 11, the image sensor 12, the mirrors 13, and the lens 14 are held in the housing of the image reading section 1. The contact glasses G1 and G2 are provided on a top face of the housing of the image reading section 1.

The light source 11 includes a plurality of light-emitting diode (LED) elements (not illustrated). The LED elements are arranged in a main scanning direction (direction perpendicular to the plane of FIG. 2). In the reading of conveyed documents, the light source 11 emits light toward the contact glass G1 (that is to say, irradiates the original document D on the contact glass G1 with light permeating the contact glass G1). In the reading of placed documents, the light source 11 emits light toward the contact glass G2 (that is to say, irradiates the original document D on the contact glass G2 with light permeating the contact glass G2). The light reflected on the original document D is further reflected on the mirrors 13 and guided to the lens 14. The lens 14 condenses the reflected light.

The image sensor 12 includes a plurality of photoelectric transducers arranged in the main scanning direction. The image sensor 12 receives the light reflected on the original document D (light condensed by the lens 14) and performs photoelectric transduction for each pixel per line to store electric charge. The image sensor 12 outputs data according to the stored electric charge.

The light source 11 and the mirrors 13 are provided on a carriage 15 that is movable in a subscanning direction orthogonal to the main scanning direction. The carriage 15 is connected to a wire 16. The wire 16 is wound on a winding drum 17. The carriage 15 moves in the subscanning direction by means of the rotation of the winding drum 17. In other words, the light source 11 and the mirrors 13 move in the subscannning direction.

In the reading of conveyed documents, an original document D is set on the original document conveyance unit 2. The original document conveyance unit 2 conveys the set original document D toward a predetermined reading position RP. The reading position RP is a specific position on the contact glass G1.

Further in the reading of conveyed documents, the carriage 15 moves to a position under the contact glass G1. In the position under the contact glass G1, the light source 11 emits light toward the contact glass G1. The image sensor 12 consecutively repeats photoelectric transduction of the light reflected on the original document D passing over the contact glass G1. The reading of the original document D is thus performed per line.

In the reading of placed documents, an original document D is placed on the contact glass G2 and, in such state, the carriage 15 moves in the subscanning direction (direction from the left toward the right as viewed from the front of the apparatus). When the carriage 15 is moving in the subscanning direction, the light source 11 emits light toward the contact glass G2. The image sensor 12 consecutively repeats photoelectric transduction of the light reflected on the original document D on the contact glass G2. The reading of the original document D is thus performed per line.

The original document conveyance unit 2 is pivotably supported on the housing of the image reading section 1. The original document conveyance unit 2 is opened and closed with respect to the top face of the housing (that is to say, with respect to the contact glasses G1 and G2) of the image reading section 1. The opening and closing (or, the pivoting) of the original document conveyance unit 2 is performed by a user.

The original document conveyance unit 2 includes an original document setting tray 201 and an original document discharging tray 202. The original document conveyance unit 2 conveys an original document D set on the original document setting tray 201 toward the reading position RP. The original document conveyance unit 2 discharges the original document D, which has passed through the reading position RP, onto the original document discharging tray 202. The original document conveyance unit 2 further includes a switchback tray 203 provided above the original document discharging tray 202.

An original document conveyance path P for conveying the original document D is provided in the original document conveyance unit 2. The original document conveyance path P includes a main conveyance path MP, a switchback conveyance path SP, and a drawing conveyance path DP.

The main conveyance path MP extends from the original document setting tray 201 to the original document discharging tray 202 via the reading position RP. The original document D as fed from the original document setting tray 201 to the main conveyance path MP is conveyed along the main conveyance path MP, and the original document D under conveyance passes through the reading position RP. When the original document D as fed from the original document setting tray 201 to the main conveyance path MP passes through the reading position RP, the front face of the original document D (face of the original document D as set on the original document setting tray 201 that is directed upward) is opposite to the contact glass G1. Consequently, the front face of the original document D is read in the reading position RP.

The switchback conveyance path SP is a conveyance path for causing the original document D to make a switchback motion and return to the main conveyance path MP. In other words, the switchback conveyance path SP is a conveyance path for inverting the front and back faces of the original document D. The switchback conveyance path SP extends from the switchback tray 203 to a position upstream in the original document conveyance direction from the reading position RP on the main conveyance path MP and, in that position, joins the main conveyance path MP.

The drawing conveyance path DP is a conveyance path for drawing the original document D from the main conveyance path MP into the switchback conveyance path SP. In other words, the drawing conveyance path DP is a connection path connecting the main conveyance path MP and the switchback conveyance path SP to each other. The drawing conveyance path DP branches off from the main conveyance path MP in a position downstream in the original document conveyance direction from the reading position RP on the main conveyance path MP and joins the switchback conveyance path SP.

In the following, the branching position between the main conveyance path MP and the drawing conveyance path DP is denoted by a reference sign P1, the joining position between the drawing conveyance path DP and the switchback conveyance path SP by a reference sign P2, and the joining position between the switchback conveyance path SP and the main conveyance path MP is denoted by a reference sign P3.

The original document conveyance unit 2 includes a document feed mechanism 21. The document feed mechanism 21 pulls out the original document D as set on the original document setting tray 201 from the original document setting tray 201 and feeds the original document D to the main conveyance path MP. The configuration of the document feed mechanism 21 is not particularly limited.

The document feed mechanism 21 includes a pickup roller 211 and a feeding roller pair 212, for instance. The pickup roller 211 abuts the original document D as set on the original document setting tray 201 in a predetermined feeding position FP. The pickup roller 211 abutting the original document D is rotated as such. The original document D is thus pulled out from the original document setting tray 201. The feeding roller pair 212 feeds the original document D pulled out from the original document setting tray 201 to the main conveyance path MP.

The original document conveyance unit 2 also includes conveying roller pairs 22, an inverting roller pair 23, and a changeover claw 24.

The conveying roller pairs 22 are two or more in number and are provided on the main conveyance path MP. The conveying roller pairs 22 convey the original document D along the main conveyance path MP.

The inverting roller pair 23 is provided on the switchback conveyance path SP. The inverting roller pair 23 inverts the conveyance direction of the original document D as drawn into the switchback conveyance path SP. The inverting roller pair 23 is switchable between normal rotation and opposite rotation.

The changeover claw 24 is pivotably provided in the branching position P1. The changeover claw 24 changes the conveyance path of the original document D in the branching position P1. The changeover claw 24 pivots between a closing position to close an original document conveyance route from the branching position P1 to the drawing conveyance path DP and an opening position to open the original document conveyance route from the branching position P1 to the drawing conveyance path DP.

When double-sided reading is performed, the original document conveyance unit 2 inverts the front and back faces of the original document D in the reading position RP. When the front and back faces of the original document D are to be inverted, the changeover claw 24 pivots toward the opening position. The inverting roller pair 23 normally rotates (that is to say, the rollers of the inverting roller pair 23 rotate in directions allowing the conveyance of the original document D toward the switchback tray 203). As a result, the original document D under conveyance (the original document D having reached the reading position RP) enters the drawing conveyance path DP through the branching position P1. The original document D, which has entered the drawing conveyance path DP, is drawn into the switchback conveyance path SP through the joining position P2.

The inverting roller pair 23 oppositely rotates after a rear end in the conveyance direction of the original document D has passed through the joining position P2 but before the rear end in the conveyance direction of the original document D completely passes through the nip of the inverting roller pair 23. In other words, the inverting roller pair 23 causes the original document D to make a switchback motion and then conveys the original document D along the switchback conveyance path SP.

The original document D conveyed along the switchback conveyance path SP returns to the main conveyance path MP through the joining position P3 and reaches the reading position RP. At this time, the front and back faces of the original document D are in an inverted state. In other words, the back face of the original document D (face of the original document D as set on the original document setting tray 201 that is directed downward) is opposite to the contact glass G1, which makes it possible to read the back face of the original document D in the reading position RP.

When double-sided reading is performed, the image reading section 1 initially reads the front face of the original document D (corresponding to a face on one side of the original document). Then, the image reading section 1 reads the back face of the original document D (corresponding to a face opposite with the face on one side of the original document). If a plurality of original documents D are successively to be read, the image reading section 1 reads the front face and the back face of the original document D as fed first, in order from the front face, before reading the front face and the back face of the original document D as fed next, in order from the front face.

Referring again to FIG. 1, the multifunction peripheral 100 includes a printing section 3. The printing section 3 conveys a sheet S and prints an image on the sheet S under conveyance. In a copying job, the printing section 3 prints, on the sheet S, an image based on original document image data that is obtained upon reading of the original document D by the image reading section 1.

The printing section 3 includes sheet feeding units 31, an image forming unit 32, and a fixing unit 33. Each sheet feeding unit 31 feeds the sheet S stored in a cassette CA to a sheet conveyance path (illustrated in FIG. 1 with broken lines). The sheet S fed to the sheet conveyance path is conveyed along the sheet conveyance path.

The image forming unit 32 includes a plurality of mechanisms 32K, 32Y, 32C, and 32M corresponding to four colors, namely black (K), yellow (Y), cyan (C), and magenta (M), respectively. The mechanisms 32K, 32Y, 32C, and 32M each form a toner image of a corresponding color and primarily transfer the toner image onto an intermediate belt. The toner image as transferred to the intermediate belt is secondarily transferred onto the sheet S under conveyance.

The fixing unit 33 presses and heats the sheet S, to which the toner image has been transferred. The toner image is thus fixed to the sheet S. The sheet S, to which the toner image has been fixed, is conveyed along the sheet conveyance path and ejected onto an ejection tray ET.

The multifunction peripheral 100 includes an operation panel 4. The operation panel 4 is provided with a touch screen 41. The touch screen 41 displays software buttons arranged in the screen and accepts settings (touch operations) by a user. The operation panel 4 is also provided with a plurality of hardware buttons 42. Examples of the hardware buttons 42 include a start button for accepting an instruction to execute a job from a user and a reset button for accepting an instruction to reset a setting on a job from a user.

Figure 3:
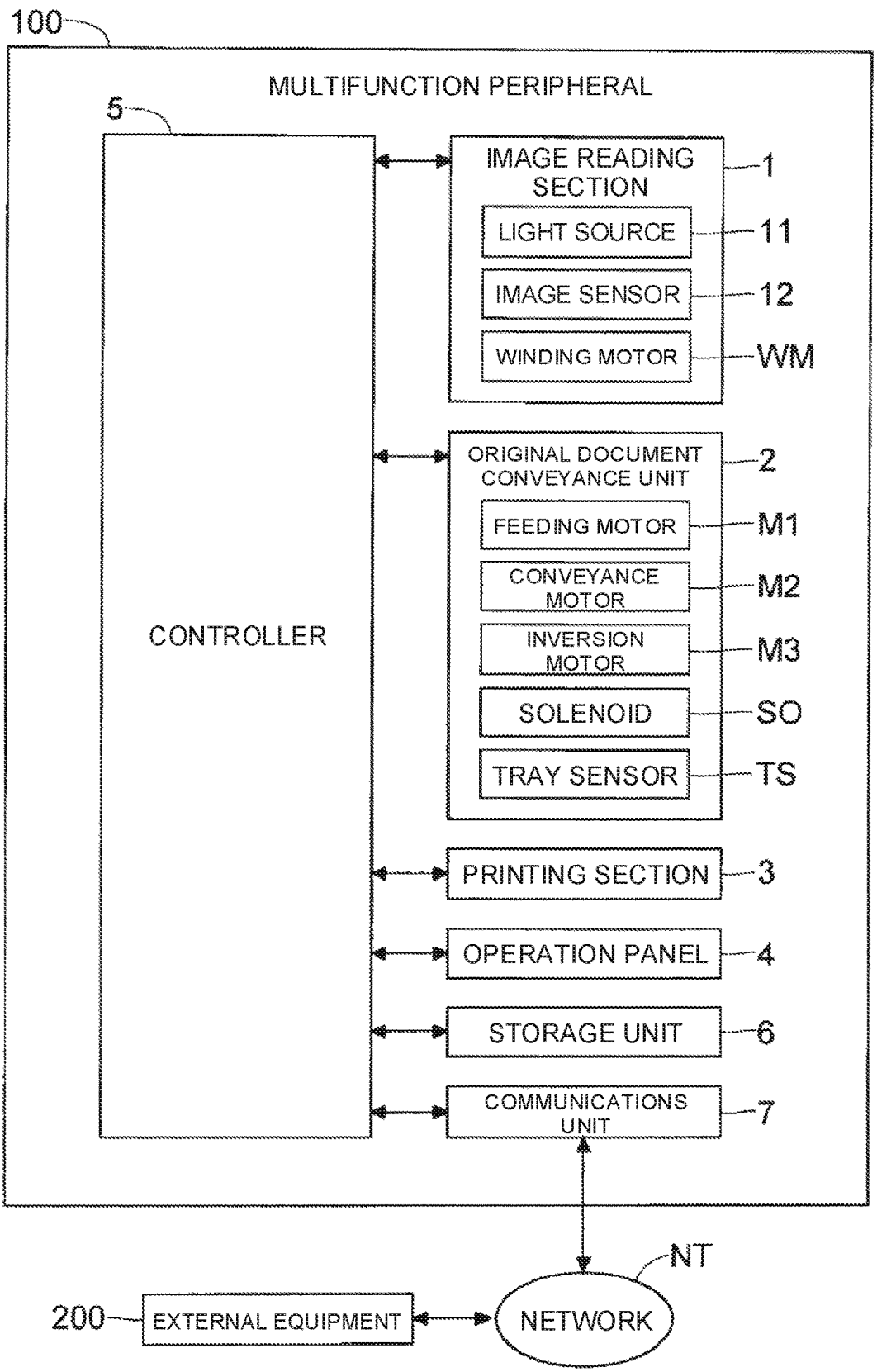
FIG. 3 is a block diagram illustrating a configuration of the multifunction peripheral according to an embodiment of the present disclosure.

As illustrated in FIG. 3, the multifunction peripheral 100 includes a controller 5. The controller 5 includes a central processing unit (CPU). The controller 5 controls the multifunction peripheral 100 based on a control program.

The multifunction peripheral 100 includes a storage unit 6. The storage unit 6 includes a non-volatile memory and a volatile memory. The storage unit 6 stores the control program. In addition, the storage unit 6 stores the original document image data obtained upon reading by the image reading section 1.

The multifunction peripheral 100 includes a communications unit 7. The communications unit 7 includes a communications circuit. The communications unit 7 is connected to a network NT such as a local area network (LAN). To the network NT, an external equipment 200 such as a user terminal (personal computer) and a server is connected.

The controller 5 controls the image reading section 1. The controller 5 is connected to the light source 11 so as to control a lighting action of the light source 11. The controller 5 is connected to the image sensor 12 so as to control an original document reading action of the image sensor 12. The controller 5 is connected to a winding motor WM for rotating the winding drum 17 so as to control the winding motor WM.

The controller 5 executes image processing on the original document image data obtained upon reading of the original document D by the image reading section 1. The controller 5 is provided with an image processing circuit (such as an application specific integrated circuit (ASIC)) for executing image processing, for instance. The controller 5 executes image processing on the original document image data and generates data for outputting the original document image data after the image processing. In the copying job, data for printing, on the sheet S, an image based on the original document image data after the image processing is generated. In a transmission job, data (such as Portable Document Format (PDF) data) for transmitting the original document image data after the image processing to the external equipment 200 is generated.

The controller 5 controls an original document conveying action of the original document conveyance unit 2. The controller 5 is connected to a feeding motor M1 for rotating the document feed mechanism 21 (the pickup roller 211 and the feeding roller pair 212), a conveyance motor M2 for rotating the conveying roller pairs 22, and an inversion motor M3 for rotating the inverting roller pair 23. The controller 5 is connected to a solenoid SO for rotating the changeover claw 24. The controller 5 controls the feeding motor M1, the conveyance motor M2, the inversion motor M3, and the solenoid SO.

If a bundle of original documents D is set on the original document setting tray 201, the original document conveyance unit 2 feeds the original documents D of the bundle to the original document conveyance path P one by one in order from the uppermost original document D and thereby conveys the original documents D. The image reading section 1 sequentially reads the original documents D conveyed to the reading position RP.

The original document setting tray 201 is provided with a lift plate (not illustrated), for instance. The lift plate is located under the original documents D as set on the original document setting tray 201. The lift plate goes up to lift the bundle of original documents D.

The going up and down of the lift plate is controlled by the controller 5. When causing the original document conveyance unit 2 to feed and convey a bundle of original documents D set on the original document setting tray 201, the controller 5 causes the lift plate to go up and makes the uppermost original document D among the original documents D of the bundle come into contact with the pickup roller 211.

In the state where the original document D is in contact with the pickup roller 211, the controller 5 rotates the pickup roller 211. As a result, the original document D is pulled out from the original document setting tray 201. In other words, the original document D is fed to the original document conveyance path P.

The controller 5 disconnects the pickup roller 211 and the feeding motor M1 from each other (that is to say, makes the pickup roller 211 free) before the original document D being fed goes through the feeding position FP. After the original document D has gone through the feeding position FP, the controller 5 rotates the pickup roller 211 again in order to feed the next original document D. The controller 5 causes the lift plate to go up and maintains the state where the original document D is in contact with the pickup roller 211.

To the controller 5, a tray sensor TS is connected. The tray sensor TS is a transmission type photosensor having a light emitting part and a light receiving part. The detection target of the tray sensor TS is an actuator (not illustrated). The actuator is provided on the original document setting tray 201. When the original document D is set on the original document setting tray 201, the actuator is pressed downward by the original document D to close (or open) the optical path (between the light emitting part and the light receiving part) of the tray sensor TS. When the original document D has left the original document setting tray 201, the pressing by the original document D is removed, so that the actuator moves upward to open (or close) the optical path of the tray sensor TS.

Consequently, the tray sensor TS changes an output value depending on whether or not the original document D is set on the original document setting tray 201. The controller 5 determines whether or not the original document D is set on the original document setting tray 201, based on the output value of the tray sensor TS.

The controller 5 controls the printing section 3. If the job to be executed is the copying job, the controller 5 generates exposure control data (data for controlling an exposure process) based on the original document image data after the image processing and outputs the exposure control data to the printing section 3. The printing section 3 forms an electrostatic latent image based on the exposure control data and develops the formed latent image into a toner image. Then, the printing section 3 transfers the toner image onto the sheet S under conveyance.

The controller 5 is connected to the operation panel 4. The controller 5 controls a displaying action of the operation panel 4. In addition, the controller 5 detects an operation performed on the operation panel 4. The operation panel 4 accepts, from a user, settings about a multi feed checking function described later.

The controller 5 is connected to the communications unit 7. The controller 5 performs communications (data transmission and reception) with the external equipment 200 through the communications unit 7. When executing the transmission job, the controller 5 generates output data (such as PDF data) based on the original document image data after the image processing and transmits the output data to the external equipment 200 through the communications unit 7.

Multi Feed Checking Function

In a job involving the reading of conveyed documents, a bundle of original documents is often set on the original document setting tray 201. If a bundle of original documents D is set on the original document setting tray 201, multi feed may occur, that is to say, a plurality of original documents D superposed on one another may be fed to the original document conveyance path P and conveyed.

Figure 4:
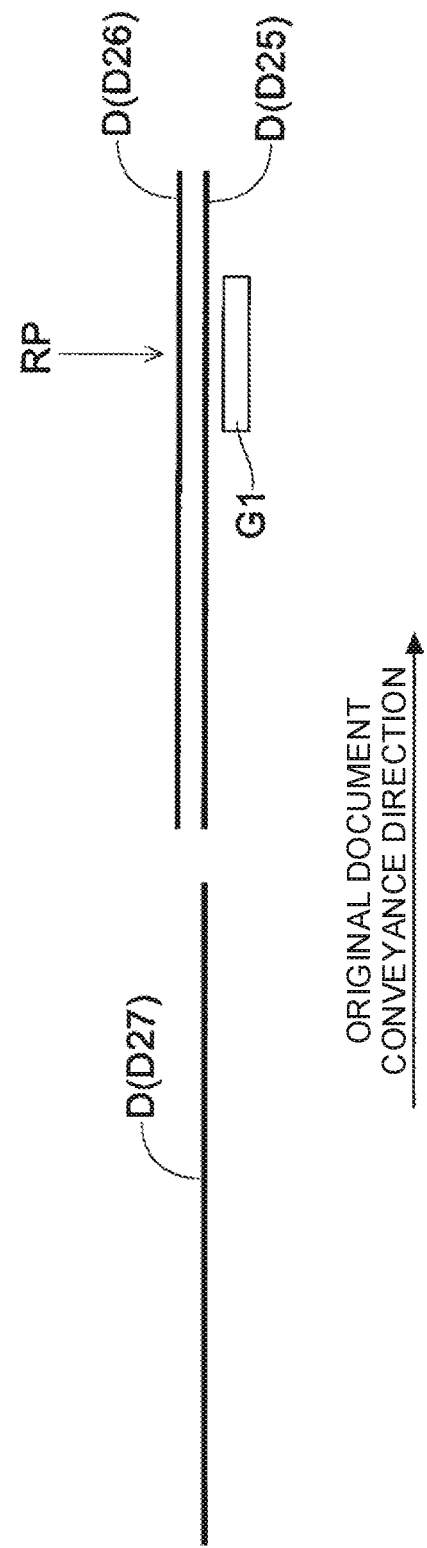
FIG. 4 is a diagram for explaining multi feed that may occur in the multifunction peripheral according to an embodiment of the present disclosure.

As an example, the original document D on page 26 (the original document D, to which a pagination "26" is imparted) is assumed to have been superposed on the original document D on page 25 (the original document D, to which a pagination "25" is imparted) and conveyed as such. If such multi feed has occurred, the original document D on page 26 is not read but the original document D on page 27 (the original document D, to which a pagination "27" is imparted) is read after the reading of the original document D on page 25. The reason is that the original document D on page 25 (additionally denoted by D25 in FIG. 4), the original document D on page 26 (additionally denoted by D26 in FIG. 4), and the original document D on page 27 (additionally denoted by D27 in FIG. 4) are conveyed in a state illustrated in FIG. 4. In other words, the original document D on page 26 has not been separated from the original document D on page 25 upon feeding of the original document D on page 25 to the original document conveyance path P.

As a result, if the job to be executed is the copying job, the sheet S, on which an image of the original document D on page 25 has been printed, and the sheet S, on which an image of the original document D on page 27 has been printed, are output in this order after the sheet S, on which an image of the original document D on page 24 (the original document D, to which a pagination "24" is imparted) has been printed, is output. In other words, there arises a situation where the 26th page is missing (page omission occurs).

In the case where the multifunction peripheral 100 is provided with a multi feed detector (sensor for detecting multi feed), for instance, a job is stopped if the multi feed detector detects multi feed. The multi feed detector, however, may not detect the multi feed having occurred. In other words, misdetection may occur. In that case, a job is continued even if multi feed occurs, leading to the page omission.

Therefore, a user may check whether or not multi feed has occurred (any pages are missing) after the reading of a plurality of original documents D. If the number of the original documents D to be read is small, it is easy to check whether or not multi feed has occurred. If, however, the number of the original documents D to be read is large, the checking requires considerable efforts, which bothers the user.

In terms of the above, the multifunction peripheral 100 is provided with a multi feed checking function. The use of the multi feed checking function frees the user from checking whether or not multi feed has occurred.

The user is able to optionally choose whether to make the multi feed checking function available. The operation panel 4 accepts the setting to make the multi feed checking function available or unavailable from the user. If the operation panel 4 accepts the setting to make the multi feed checking function available, the controller 5 sets the multi feed checking function to be available.

The controller 5 starts a job involving the reading of conveyed documents if the operation panel 4 accepts an instruction to execute the job. The controller 5 determines that an instruction to execute the job involving the reading of conveyed documents has been accepted if detecting an operation on a start button of the operation panel 4 in the state, where the original document D is set on the original document setting tray 201.

If the instruction to execute the job involving the reading of conveyed documents is accepted, the controller 5 starts the reading of conveyed documents by the image reading section 1. During the execution of the job involving the reading of conveyed documents, the original document conveyance unit 2 sequentially conveys original documents D of a bundle of original documents D set on the original document setting tray 201 toward the reading position RP. The image reading section 1 sequentially reads the original documents D conveyed to the reading position RP. The controller 5 sequentially acquires original document image data obtained upon reading of the original documents D.

The controller 5 executes a process related to the multi feed checking function (hereinafter referred to as "multi feed check process") if the multi feed checking function is set to be available. For instance, the controller 5 executes the multi feed check process before the output of original document image data after the reading of original documents D by the image reading section 1 has been completed (that is to say, after all the original documents D have gone out of the original document setting tray 201). If the job to be executed is the copying job, the multi feed check process may be executed in parallel with the output of original document image data (printing of an image based on the original document image data on the sheet S).

The controller 5 executes a reference setting process as a process included in the multi feed check process. When executing the reference setting process, the controller 5 forms a matrix on a memory of the storage unit 6. The controller 5 sets one row of the matrix as a reference row.

Figure 5:
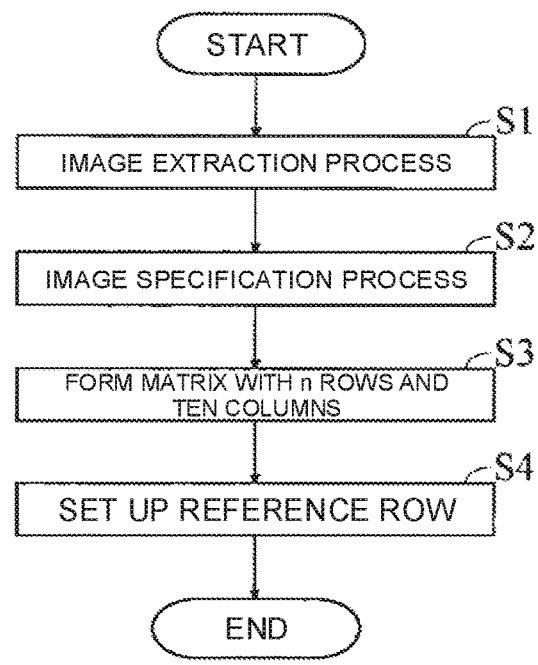
FIG. 5 is a chart illustrating a flow of a reference setting process executed by a controller in the multifunction peripheral according to an embodiment of the present disclosure.

Referring now to a flowchart illustrated in FIG. 5, description is made on the flow of the reference setting process executed by the controller 5. The flow illustrated in FIG. 5 starts when the controller 5 determines that the reading of original documents D by the image reading section 1 has been completed (that is to say, all the original documents D have gone out of the original document setting tray 201). In other words, the controller 5 executes the reference setting process after acquiring all the original document image data of the original documents D read by the image reading section 1.

In step S1, the controller 5 executes an image extraction process. In the image extraction process, the controller 5 extracts a pagination image including an image corresponding to a pagination imparted to the original document D from each of a plurality of pieces of original document image data that correspond to a plurality of original documents D successively read by the image reading section 1 in one job (job involving the reading of conveyed documents), respectively.

The controller 5 sequentially selects the pieces of original document image data one by one as a process target of the image extraction process. After terminating the image extraction process on the piece of original document image data as a process target, the controller 5 selects a piece of original document image data not selected yet as a new process target. Then, the controller 5 executes the image extraction process on the piece of original document image data as a new process target. The controller 5 executes the image extraction process on all the pieces of original document image data.

The controller 5 binarizes the piece of original document image data as a process target. The controller 5 detects a black pixel region composed of a cluster of black pixels alone from the piece of original document image data as a process target. During such detection, labeling may be performed.

Figure 6:
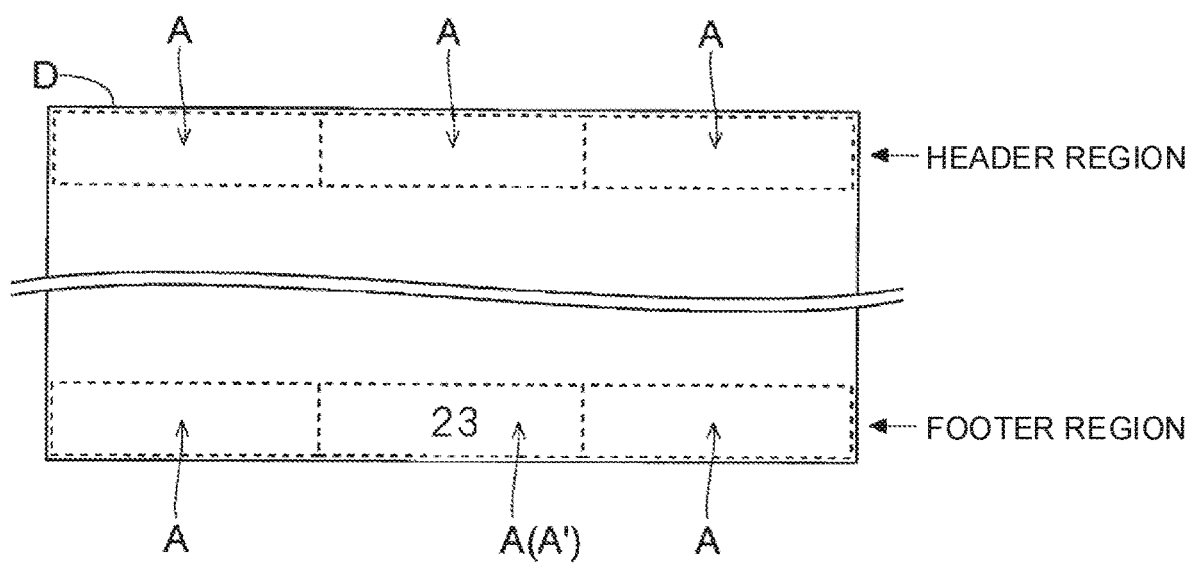
FIG. 6 is a diagram illustrating a header region and a footer region of an original document that is to be read in the multifunction peripheral according to an embodiment of the present disclosure.

Furthermore, the controller 5 recognizes a plurality of specific regions in the piece of original document image data as a process target. For instance, a header region and a footer region of the original document D are each divided into two or more areas A as illustrated in FIG. 6, and the regions in the piece of original document image data, which correspond to the areas A, respectively, are considered as the specific regions. A pagination is generally added in the header region or the footer region of the original document D. In other words, the specific regions are each a region that may include an image corresponding to the pagination imparted to the original document D. In FIG. 6, "23" written in an area A' is an example of the pagination imparted to the original document D.

In the example illustrated in FIG. 6, the header region and the footer region of the original document D are each divided into three areas A and, accordingly, the specific regions are six in number, while the number of the specific regions is not particularly limited. Two regions in the piece of original document image data, one corresponding to the header region of the original document D and the other corresponding to the footer region of the original document D, may be considered as the specific regions.

After recognizing a plurality of specific regions in the piece of original document image data as a process target, the controller 5 determines whether or not a specific region including an image corresponding to a pagination is present in the piece of original document image data as a process target. If a pagination is added in the header region or the footer region of the original document D, which corresponds to the piece of original document image data as a process target, an image corresponding to the pagination appears in some specific region or another in the piece od original document image data as a process target.

In the example illustrated in FIG. 6, a pagination is added in the area A' in the footer region of the original document D, and no paginations are added in the other areas A. In this case, a black pixel region appears in the specific region, which corresponds to the area A', among the specific regions in the piece of original document image data as a process target, whereas any black pixel regions do not appear in the specific regions corresponding to the other areas A.

Therefore, the controller 5 determines, for each specific region in the piece of original document image data as a process target, whether or not a black pixel region is present in the relevant specific region. The controller 5 extracts, as a pagination image, an image of the specific region, in which a black pixel region is present, among the specific regions in the piece of original document image data as a process target. In the image of the specific region, an image corresponding to a pagination imparted to the original document D is included.

After the image extraction process, the controller 5 executes an image specification process in step S2. In the image specification process, the controller 5 specifies a last-digit image present in each of the pagination images, which are extracted from a plurality of pieces of original document image data, respectively. The last-digit image is an image corresponding to a digit in the ones place of a pagination imparted to the original document D.

The controller 5 sequentially selects the pagination images one by one as a process target of the image specification process. After terminating the image specification process on the pagination image as a process target, the controller 5 selects a pagination image not selected yet as a new process target. Then, the controller 5 executes the image specification process on the pagination image as a new process target. The controller 5 executes the image specification process on all the pagination images.

Figure 7:
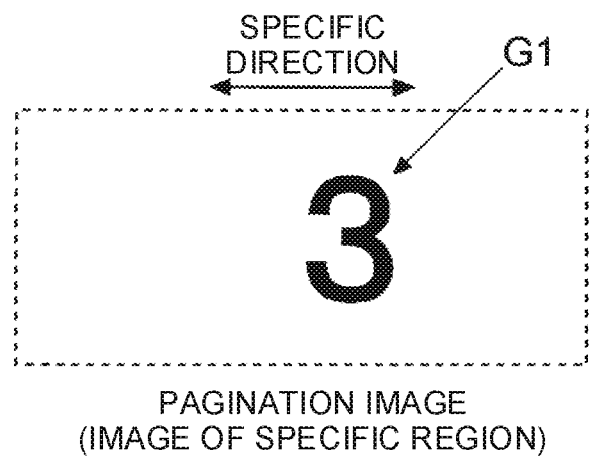
FIG. 7 is a diagram illustrating a pagination image extracted by the controller in the multifunction peripheral according to an embodiment of the present disclosure from original document image data.

If a single black pixel region is present in the pagination image as a process target, the controller 5 determines that the image of the single black pixel region is a last-digit image. If a pagination image (image of a specific region) illustrated in FIG. 7 is the process target, it is determined that an image G1 of the single black pixel region in the pagination image is a last-digit image.

Figure 8:
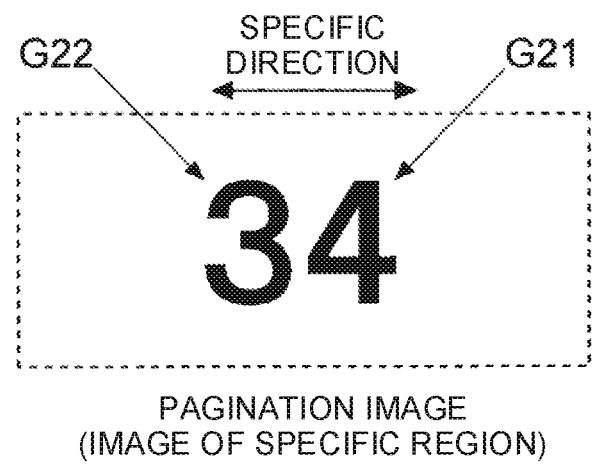
FIG. 8 is a diagram illustrating a pagination image extracted by the controller in the multifunction peripheral according to an embodiment of the present disclosure from original document image data.

If a plurality of black pixel regions are present in the pagination image as a process target, the controller 5 determines that the image of a black pixel region among the black pixel regions that is located at the very end on one side (the right) in a specific direction (lateral direction) is a last-digit image. For instance, if a pagination image (image of a specific region) illustrated in FIG. 8 is the process target, it is determined that, out of images G21 and G22 of black pixel regions present in the pagination image, the image G21 is a last-digit image.

Sometimes a hyphenated pagination is imparted to the original document D. An image corresponding to a hyphen linearly extends in a specific direction. Therefore, if a plurality of black pixel regions are present in the pagination image as a process target, the controller 5 determines that the image of a black pixel region linearly extending in a specific direction is not a last-digit image. In other words, the controller 5 determines that the image of a black pixel region at the very end on one side in a specific direction among a plurality of black pixel regions exclusive of those linearly extending in the specific direction is a last-digit image.

After the image specification process, in step S3, the controller 5 arrays a plurality of pagination images in a reading order of the original documents D corresponding to the pieces of original document image data as extraction sources of the pagination images, the reading order beginning with the original document D earliest read, to form a matrix with n rows and ten columns. The number of rows of the matrix formed by the controller 5 depends on the number of extracted pagination images (number of generated pieces of original document image data), namely, the number of read original documents D.

It is assumed, for instance, that 40 original documents D, to which page numbers (paginations) "1" through "40" are imparted, respectively, have regularly been read in order of page number, that is to say, without multi feed. In that case, a matrix illustrated in FIG. 9 is formed.

After forming the matrix, in step S4, the controller 5 recognizes last-digit images in the pagination images included in the respective rows of the formed matrix. The controller 5 sets a row including ten different last-digit images as a reference row.

For instance, the controller 5 initially selects the first row of the matrix and determines whether or not ten different last-digit images are included in the first row (selected row). If ten different last-digit images are included in the first row, the controller 5 sets the first row as the reference row.

If ten different last-digit images are not included in the selected row, the controller 5 newly selects the next row and determines whether or not ten different last-digit images are included in the newly selected low. If ten different last-digit images are included in the newly selected low, the controller 5 sets the newly selected row as the reference row.

In the example illustrated in FIG. 9, ten different last-digit images corresponding to "1", "2", "3", "4", "5", "6", "7", "8", "9", and "0", respectively, are included in the first row. Therefore, the first row is set as the reference row. In FIG. 9, the reference row is indicated with an arrow, and the last-digit images in the reference row are each enclosed with a broken line.

As another example, it is assumed that a matrix illustrated in FIG. 10 is formed. The matrix illustrated in FIG. 10 is formed if, although 40 original documents D, to which page numbers "1" through "40" are imparted, respectively, are to be read, multi feed has occurred such that the original document D on page 26 (the original document D, to which the pagination "26" is imparted) is superposed on the original document D on page 25 (the original document D, to which the pagination "25" is imparted).

In the example illustrated in FIG. 10, ten different last-digit images are included in the first row, as is the case with the example illustrated in FIG. 9. Therefore, the first row is set as the reference row. In FIG. 10, the reference row is indicated with an arrow, and the last-digit images in the reference row are each enclosed with a broken line.

As yet another example, it is assumed that a matrix illustrated in FIG. 11 is formed. The matrix illustrated in FIG. 11 is formed if, although 40 original documents D, to which page numbers "1" through "40" are imparted, respectively, are to be read, multi feed has occurred such that the original document D on page 6 (the original document D, to which a pagination "6" is imparted) is superposed on the original document D on page 5 (the original document D, to which a pagination "5" is imparted).

In the example illustrated in FIG. 11, ten different last-digit images are not included in the first row. In the second row, ten different last-digit images are included. Therefore, the second row is set as the reference row. In FIG. 11, the reference row is indicated with an arrow, and the last-digit images in the reference row are each enclosed with a broken line.

After setting one row of the matrix as the reference row, the controller 5 determines whether or not any rows follow the reference row. If any rows follow the reference row, the controller 5 executes first processing. In addition, the controller 5 determines whether or not any rows precede the reference row. If any rows precede the reference row, that is to say, the row, which has been set as the reference row, is not the first row, the controller 5 executes second processing.

In the examples illustrated in FIGS. 9 and 10, respectively, the first processing is executed. The second processing, however, is not executed because the row, which has been set as the reference row, is the first row. In the example illustrated in FIG. 11, the row, which has been set as the reference row, is the second row, so that the reference row is preceded and followed by rows. Consequently, both of the first processing and the second processing are executed.

1. First Processing

Figure 12:
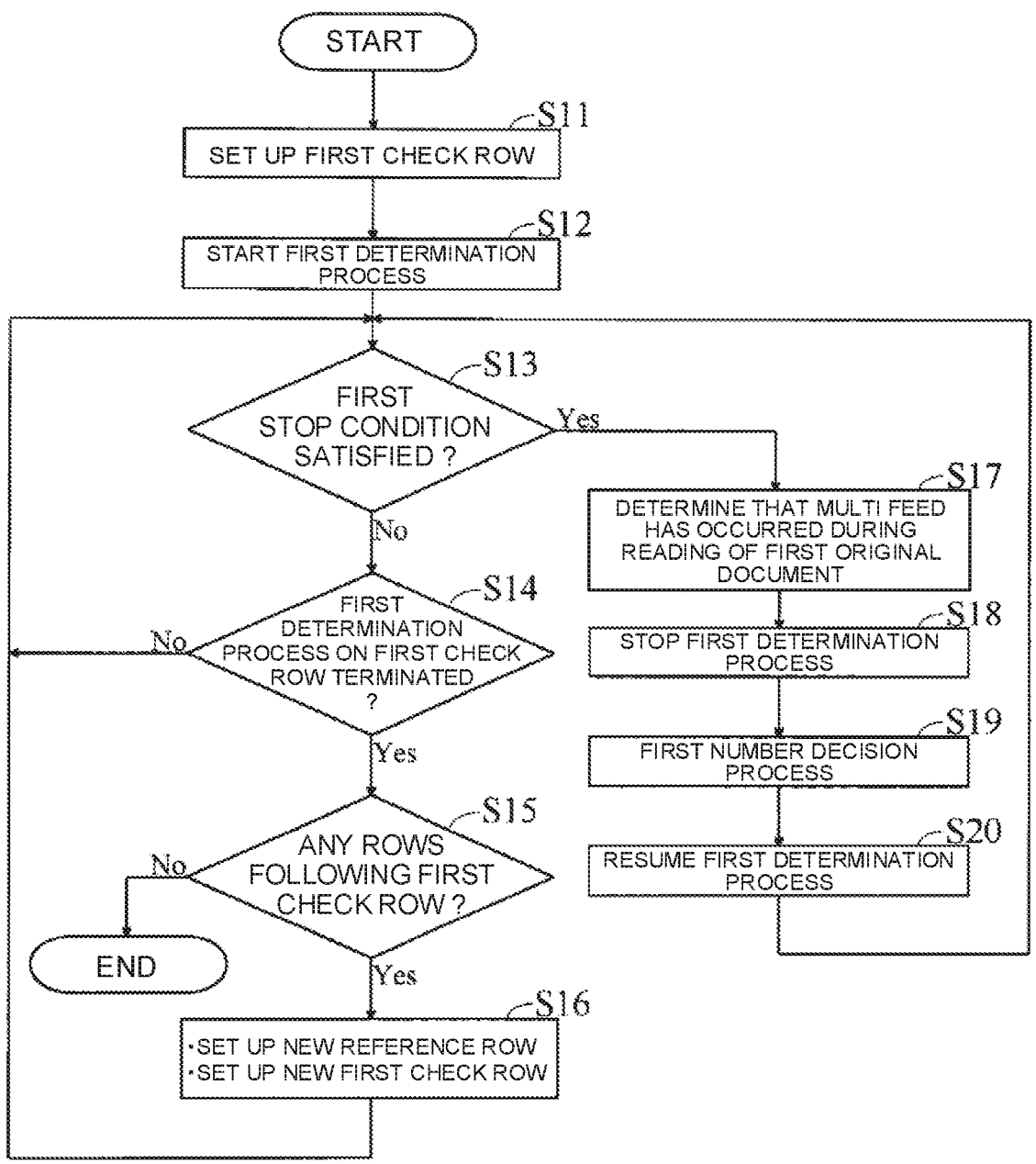
FIG. 12 is a chart illustrating a flow of first processing executed by the controller in the multifunction peripheral according to an embodiment of the present disclosure.

Referring to a flowchart illustrated in FIG. 12, description is initially made on the flow of the first processing executed by the controller 5. The flow illustrated in FIG. 12 starts when the reference setting process has been completed. After the completion of the reference setting process, the second processing may be started first and the first processing may be started after the second processing has been completed. If no rows follow the reference row, the first processing is not executed.

In step S11, the controller 5 sets the row next to the reference row as a first check row. In the example illustrated in FIG. 9, the second row is set as the first check row. In the example illustrated in FIG. 10, the second row is set as the first check row. In the example illustrated in FIG. 11, the third row is set as the first check row.

In step S12, the controller 5 starts a first determination process on the first check row. Specifically, with respect to the pagination images in respective columns of the first check row, the controller 5 determines, in order from the first column, whether or not a pagination image of the first check row is a first subject pagination image. The controller 5 determines that a pagination image of the first check row that differs in last-digit image from the pagination image in the identical column of the reference row is the first subject pagination image.

The controller 5 initially selects the pagination image in the first column of the first check row and determines whether or not the pagination image in the first column (selected pagination image) is the first subject pagination image. If determining that the selected pagination image is not the first subject pagination image, the controller 5 continues the first determination process. If determining that a pagination image in some column is not the first subject pagination image, the controller 5 newly selects a pagination image in the next column and determines whether or not the newly selected pagination image is the first subject pagination image.

The description below is made on an example of the first determination process.

The controller 5 composites a pagination image (pagination image in the column, where the selected pagination image is located) of the reference row and the selected pagination image to generate composite image data. Then, the controller 5 detects, as a difference region, a region in the composite image data that corresponds to the region, in which the absolute value of the difference between pixel values of the pagination image (pagination image in the column, where the selected pagination image is located) of the reference row and the selected pagination image is equal to or larger than a specific value.

In addition, the controller 5 binarizes the composite image data and detects a black pixel region (region composed of a cluster of black pixels) corresponding to the ones place of a pagination from the binarized composite image data. If the pagination corresponding to the pagination image (pagination image in the column, where the selected pagination image is located) of the reference row is of a single digit and the pagination corresponding to the selected pagination image is of double digits, two black pixel regions are detected from the composite image data obtained by compositing such two pagination images. Also in the case where both of the pagination corresponding to the pagination image (pagination image in the column, where the selected pagination image is located) of the reference row and the pagination corresponding to the selected pagination image are of double digits, two black pixel regions are detected from the composite image data obtained by compositing such two pagination images. The controller 5 recognizes that a black pixel region on one side (the right) in a specific direction (lateral direction) among a plurality of black pixel regions in composite image data corresponds to the ones place of a pagination.

After detecting a black pixel region corresponding to the ones place of a pagination from the composite image data, the controller 5 counts the number of pixels of the difference region in the black pixel region corresponding to the ones place. The controller 5 determines whether or not the selected pagination image is the first subject pagination image (pagination image differing in last-digit image from the pagination image in the identical column of the reference row) based on whether or not the counted number of pixels of the difference region is equal to or larger than a predetermined threshold.

If the last-digit image in the pagination image (pagination image in the column, where the selected pagination image is located) of the reference row and the last-digit image in the selected pagination image are the same, the number of pixels of the difference region is not equal to or larger than the threshold. Therefore, after counting the number of pixels of the difference region, the controller 5 determines that the selected pagination image is the first subject pagination image if the number of pixels of the difference region is equal to or larger than the threshold and, if the number of pixels of the difference region is smaller than the threshold, the controller 5 determines that the selected pagination image is not the first subject pagination image.

In the example illustrated in FIG. 10, the last-digit image in the pagination image in the first column of the reference row and the last-digit image in the pagination image in the first column of the first check row (the second row) are the same. Consequently, it is not determined that the pagination image in the first column of the first check row is the first subject pagination image.

In step S13, the controller 5 determines whether or not a first stop condition for stopping the first determination process is satisfied. The controller 5 determines that the first stop condition is satisfied if determining that the selected pagination image is the first subject pagination image (that is to say, determining that some pagination image or another of the first check row is the first subject pagination image).

If the controller 5 determines in step S13 that the first stop condition is not satisfied, the processing proceeds to step S14. In step S14, the controller 5 determines whether or not the first determination process on the first check row has been terminated. If the controller 5 determines that the first determination process on the first check row has not been terminated, the processing proceeds to step S13. On the other hand, if the controller 5 determines that the first determination process on the first check row has been terminated, the processing proceeds to step S15.

In step S15, the controller 5 determines whether or not any rows follow the first check row. If the controller 5 determines that one or more rows follow the first check row, the processing proceeds to step S16. If the controller 5 determines that no rows follow the first check row, the flow ends.

In step S16, the controller 5 sets the current first check row as a new reference row. In addition, the controller 5 sets the row next to the new reference row as a new first check row. Then, the processing proceeds to step S13. In other words, the controller 5 continues the first determination process (that is to say, executes the first determination process on the new first check row).

If the controller 5 determines in step S13 that the first stop condition is satisfied (that is to say, the selected pagination image is the first subject pagination image), the processing proceeds to step S17. In step S17, the controller 5 determines that multi feed has occurred during the reading of the original document D (hereinafter referred to as "first original document D"), which has last been read before the original document D corresponding to the piece of original document image data as an extraction source of the first subject pagination image. In step S18, the controller 5 stops the first determination process.

After stopping the first determination process, the controller 5 executes a first number decision process in step S19. In the first number decision process, the number of original documents D superposed on the first original document D is decided.

As one process included in the first number decision process, the controller 5 executes a first change process for changing the arraying order of pagination images in a matrix. In the first change process, the controller 5 changes the position of a pagination image after the first subject pagination image in the matrix to the position immediately after the current position and changes the position of the first subject pagination image to the position immediately after the current position.

Figure 13:
FIG. 13 is a diagram for explaining a first change process executed by the controller in the multifunction peripheral according to an embodiment of the present disclosure.

Referring now to FIG. 13, a concrete description is made on the first change process. In FIG. 13, a matrix before the first change process is illustrated in an upper portion and the matrix after the first change process is illustrated in a lower portion. The matrix illustrated in the upper portion of FIG. 13 is the same as the matrix illustrated in FIG. 10.

In the example illustrated in FIG. 13, the controller 5 initially sets the first row as a reference row and executes the first determination process on the second row (that is to say, sets the second row as a first check row). Subsequently, the controller 5 sets the second row as a new reference row and executes the first determination process on the third row. During the execution of the first determination process on the third row, the controller 5 determines that the pagination image in the sixth column of the third row is the first subject pagination image. At this time, the controller 5 determines that multi feed has occurred during the reading of the original document D (the original document D, to which the pagination "25" is imparted) last read before the original document D corresponding to the piece of original document image data as an extraction source of the pagination image in the sixth column of the third row. Further, the controller 5 determines that the first stop condition is satisfied, and stops the first determination process.

If the pagination image in the sixth column of the third row is the first subject pagination image, the controller 5 changes the position in the matrix of a pagination image extracted from a piece of original document image data of the original document D in or after the 26th place in the reading order to the position immediately after the current position. As an example, the position of a pagination image corresponding to a pagination "28" (that is to say, the pagination image, which is located in the seventh column of the third row before the first change process) is changed to the position in the eighth column of the third row. The position of a pagination image corresponding to a pagination "31" (that is to say, the pagination image, which is located in the tenth column of the third row before the first change process) is changed to the position in the first column of the fourth row. The position of a pagination image corresponding to a pagination "40" (that is to say, the pagination image, which is located in the ninth column of the fourth row before the first change process) is changed to the position in the tenth column of the fourth row.

In addition, if the pagination image in the sixth column of the third row is the first subject pagination image, the controller 5 changes the position in the matrix of the pagination image in the sixth column of the third row to the position immediately after the current position. In other words, the position of the pagination image in the sixth column of the third row is changed to the position in the seventh column of the third row.

In the matrix illustrated in the upper portion of FIG. 13, the pagination images to be displaced are each enclosed with a solid line circle. The destinations of the pagination images to be displaced are indicated with solid line arrows.

During the execution of the first change process, the controller 5 sets the current position in the matrix of the first subject pagination image as a first copy position. After changing the position of the first subject pagination image from the first copy position in the first change process, the controller 5 copies a pagination image of the reference row that is located in the column including the first copy position (position in the matrix of the first subject pagination image before the first change process), into the first copy position.

In the example illustrated in FIG. 13, the pagination image in the sixth column of the second row (pagination image corresponding to a pagination "16") is copied in the sixth column of the third row. In the matrix illustrated in the upper portion of FIG. 13, the pagination image as a copy source is enclosed with a broken line circle, and the copy destination is indicated with a broken line arrow. By means of the first change process as above, the matrix illustrated in the upper portion of FIG. 13 is changed into the matrix illustrated in the lower portion of FIG. 13.

After executing the first change process once, the controller 5 executes a first condition determination process for determining whether or not a first condition is satisfied. In the first condition determination process, the controller 5 determines that the first condition is satisfied if determining that the last-digit image in a pagination image of the reference row that is located in the column including the current position (position after the first change process) of the first subject pagination image and the last-digit image in the first subject pagination image are the same. If determining, in the first condition determination process after executing the first change process once, that the first condition is satisfied, the controller 5 determines that one original document D has been superposed on the first original document D.

Whether or not the last-digit image in a pagination image of the reference row that is located in the column including the current position of the first subject pagination image and the last-digit image in the first subject pagination image are the same (whether or not the first condition is satisfied) may be determined by compositing a pagination image of the reference row that is located in the column including the current position of the first subject pagination image and the first subject pagination image to generate composite image data, and determining whether or not the number of pixels of the difference region in a black pixel region that corresponds to the ones place and is detected from the generated composite image data is equal to or larger than the threshold. In other words, it may be determined that the last-digit image in a pagination image of the reference row that is located in the column including the current position of the first subject pagination image and the last-digit image in the first subject pagination image are the same if the number of pixels of the difference region is smaller than the threshold, and it may be determined that the last-digit image in a pagination image of the reference row that is located in the column including the current position of the first subject pagination image and the last-digit image in the first subject pagination image are different from each other if the number of pixels of the difference region is equal to or larger than the threshold.

In the storage unit 6, a first count value indicating the number of times the first change process has been executed is stored. The controller 5 resets the first count value (that is to say, sets the first count value to zero) before starting a job involving the reading of conveyed documents. The controller 5 increases the first count value by one every time the controller 5 executes the first change process.

The controller 5 increases the first count value by one when executing the first change process for the first time. If determining in the first condition determination process after executing the first change process once that the first condition is not satisfied, the controller 5 repeats the first change process until determining that the first condition is satisfied. The controller 5 determines that the original documents D, whose number is equivalent to the first count value when the controller 5 determines that the first condition is satisfied, have been superposed on the first original document D.

In the example illustrated in FIG. 13, the first change process is executed based on the determination that a pagination image corresponding to the pagination "27" (the pagination image in the sixth column of the third row) is the first subject pagination image. After the first change process was executed once, the pagination image corresponding to the pagination "27" is displaced into the seventh column of the third row. On the other hand, in the seventh column of the second row, a pagination image corresponding to a pagination "17" is located.

As a result, it is determined that the last-digit image in a pagination image of the reference row that is located in the column including the current position of the first subject pagination image and the last-digit image in the first subject pagination image are the same. In other words, it is determined that the first condition is satisfied. After the first change process was executed once, the first count value is changed to one, so that it is determined that one original document D has been superposed on the first original document D.

Although not illustrated, it is assumed that, apart from the original document D on page 26 (the original document D, to which the pagination "26" is imparted), the original document D on page 27 (the original document D, to which the pagination "27" is imparted) has been superposed on the original document D on page 25 (the original document D, to which the pagination "25" is imparted) in the example illustrated in FIG. 13.

In that case, the formed matrix is such that the pagination image corresponding to the pagination "28" is located in the sixth column of the third row. It is determined, accordingly, that the pagination image corresponding to the pagination "28" is the first subject pagination image. As described above, the pagination image corresponding to the pagination "17" is located in the seventh column of the second row (the seventh column of the reference row). In consequence, in the first condition determination process after the first change process was executed once, it is not determined that the first condition is satisfied.

When the first change process is executed again after the first execution of the first condition determination process (that is to say, when the first change process is executed twice in total), the pagination image corresponding to the pagination "28" is displaced into the eighth column of the third row. In the eighth column of the second row (the eighth column of the reference row), a pagination image corresponding to a pagination "18" is located. Consequently, in the first condition determination process after the first change process was executed twice, it is determined that the first condition is satisfied. After the first change process was executed twice, the first count value is changed to two, so that it is determined that two original documents D have been superposed on the first original document D.

After the first number decision process (that is to say, after the controller 5 determines that the first condition is satisfied), the processing proceeds to step S20. In step S20, the controller 5 resumes the first determination process from the position immediately after the position of the first subject pagination image after the first change process. Subsequently, the processing proceeds to step S13.

In the example illustrated in FIG. 13, the first determination process is resumed from the eighth column of the third row (the eighth column of the first check row) of the matrix illustrated in the lower portion of FIG. 13. The arraying order of the pagination images in the matrix has been changed by executing the first change process. In the matrix after the first change process, the last-digit image in each pagination image of the third row (the first check row) is the same as the last-digit image in the pagination image in the identical column of the second row (the reference row). Therefore, after the first determination process is resumed, it is not determined that a pagination image of the third row is the first subject pagination image.

After the termination of the first determination process on the third row (the first check row), the first determination process is continued. Then, the third row is set as a new reference row and the fourth row is set as a new first check row.

Before the execution of the first change process, the pagination image corresponding the pagination "27" is located in the sixth column of the third row (see the upper portion of FIG. 13). When the first determination process is resumed, pagination images corresponding to the pagination "27" through the pagination "40", respectively, have each been displaced one position after the position before the first change process. In the sixth column of the third row, the pagination image corresponding to the pagination "16" has been copied. Consequently, it is not determined that a pagination image of the fourth row is the first subject pagination image.

2. Second Processing

Figure 14:
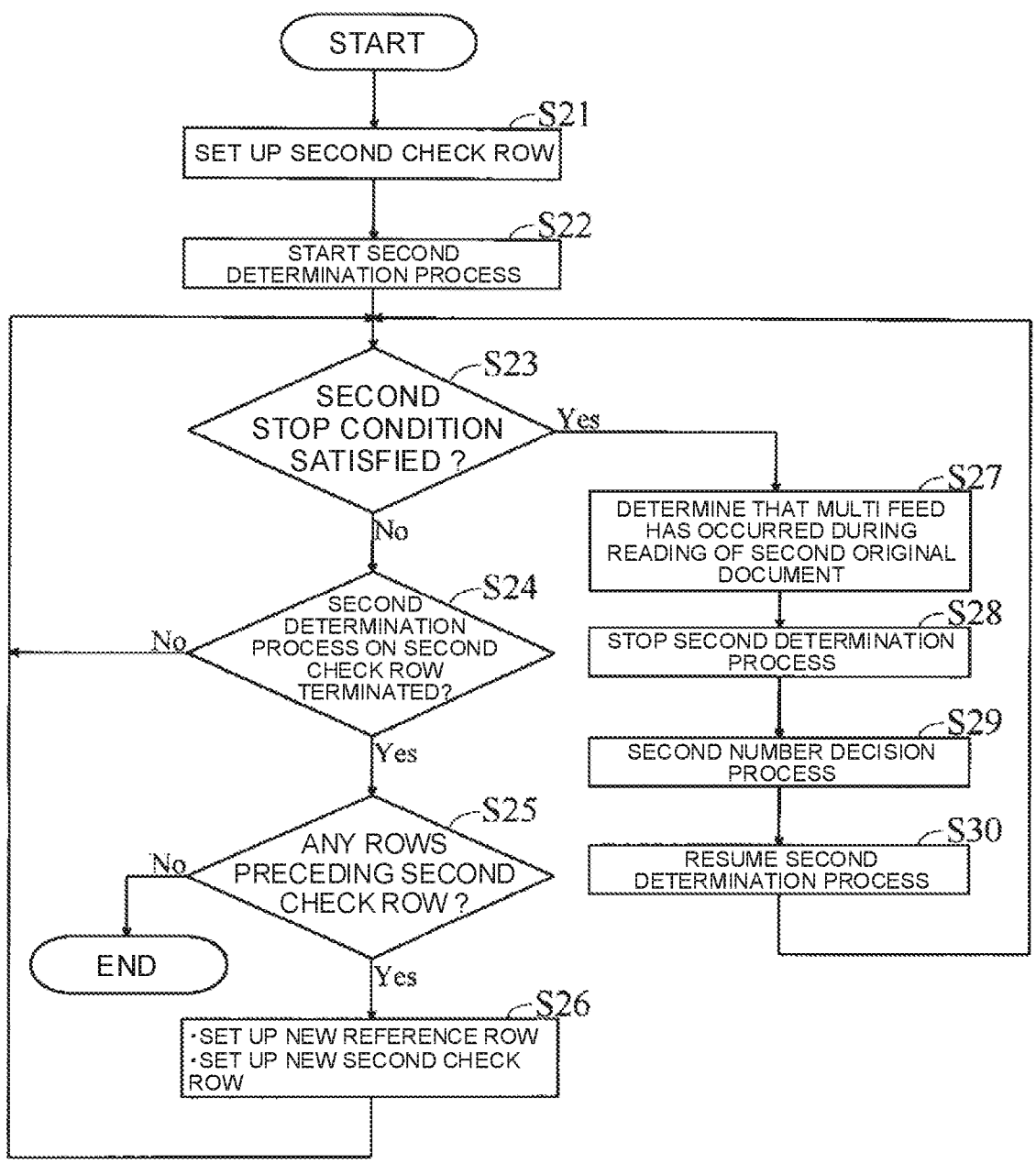
FIG. 14 is a chart illustrating a flow of second processing executed by the controller in the multifunction peripheral according to an embodiment of the present disclosure.

Next, referring to a flowchart illustrated in FIG. 14, description is made on the flow of the second processing executed by the controller 5.

The flow illustrated in FIG. 14 starts when the first processing has been completed. If no rows follow the row initially set as a reference row, the second processing is started when the reference setting process has been completed. If no rows precede the row initially set as a reference row (that is to say, if the first row has initially been set as a reference row), the second processing is not executed. The second processing is only executed if the second row or a row after the second row has initially been set as a reference row.

In step S21, the controller 5 sets the row previous to the row, which has initially been set as a reference row, as a second check row. In the examples illustrated in FIGS. 9 and 10, respectively, the second processing is not executed. In the example illustrated in FIG. 11, the first row is set as the second check row.

In step S22, the controller 5 starts a second determination process on the second check row. Specifically, with respect to the pagination images in respective columns of the second check row, the controller 5 determines, in order from the tenth column, whether or not a pagination image of the second check row is a second subject pagination image. The controller 5 determines that a pagination image of the second check row that differs in last-digit image from the pagination image in the identical column of the reference row is the second subject pagination image.

The controller 5 initially selects the pagination image in the tenth column of the second check row and determines whether or not the pagination image in the tenth column (selected pagination image) is the second subject pagination image. If determining that the selected pagination image is not the second subject pagination image, the controller 5 continues the second determination process. If determining that a pagination image in some column is not the second subject pagination image, the controller 5 newly selects a pagination image in the previous column and determines whether or not the newly selected pagination image is the second subject pagination image.

The second determination process is executed similarly to the first determination process. In other words, the controller 5 composites a pagination image (pagination image in the column, where the selected pagination image is located) of the reference row and the selected pagination image to generate composite image data, and determines whether or not the selected pagination image is the second subject pagination image based on whether or not the number of pixels of the difference region in a black pixel region that corresponds to the ones place and is detected from the generated composite image data is equal to or larger than a threshold.

In step S23, the controller 5 determines whether or not a second stop condition for stopping the second determination process is satisfied. The controller 5 determines that the second stop condition is satisfied if determining that the selected pagination image is the second subject pagination image (that is to say, determining that some pagination image or another of the second check row is the second subject pagination image).

If the controller 5 determines in step S23 that the second stop condition is not satisfied, the processing proceeds to step S24. In step S24, the controller 5 determines whether or not the second determination process on the second check row has been terminated. If the controller 5 determines that the second determination process on the second check row has not been terminated, the processing proceeds to step S23. On the other hand, if the controller 5 determines that the second determination process on the second check row has been terminated, the processing proceeds to step S25.

In step S25, the controller 5 determines whether or not any rows precede the second check row. If the controller 5 determines that one or more rows precede the second check row, the processing proceeds to step S26. If the controller 5 determines that no rows precede the second check row, the flow ends.

In step S26, the controller 5 sets the current second check row as a new reference row. In addition, the controller 5 sets the row previous to the new reference row as a new second check row. Then, the processing proceeds to step S23. In other words, the controller 5 continues the second determination process (that is to say, executes the second determination process on the new second check row).

If the controller 5 determines in step S23 that the second stop condition is satisfied (that is to say, the selected pagination image is the second subject pagination image), the processing proceeds to step S27. In step S27, the controller 5 determines that multi feed has occurred during the reading of the original document D (hereinafter referred to as "second original document D") corresponding to the piece of original document image data as an extraction source of the second subject pagination image. In step S28, the controller 5 stops the second determination process.

After stopping the second determination process, the controller 5 executes a second number decision process in step S29. In the second number decision process, the number of original documents D superposed on the second original document D is decided.

As one process included in the second number decision process, the controller 5 executes a second change process for changing the arraying order of pagination images in a matrix. In the second change process, the controller 5 changes the position of a pagination image before the second subject pagination image in the matrix to the position immediately before the current position and changes the position of the second subject pagination image to the position immediately before the current position.

Referring now to FIG. 15, a concrete description is made on the second change process. In FIG. 15, a matrix before the second change process is illustrated in an upper portion and the matrix after the second change process is illustrated in a lower portion. The matrix illustrated in the upper portion of FIG. 15 is the same as the matrix illustrated in FIG. 11.

In the example illustrated in FIG. 15, the second row is initially set as a reference row. As a result, the second determination process is executed on the first row (that is to say, the first row is set as a second check row). During the execution of the second determination process on the first row, the controller 5 determines that the pagination image in the fifth column of the first row is the second subject pagination image. At this time, the controller 5 determines that multi feed has occurred during the reading of the original document D (the original document D, to which the pagination "5" is imparted) corresponding to the piece of original document image data as an extraction source of the pagination image in the fifth column of the first row. Further, the controller 5 determines that the second stop condition is satisfied, and stops the second determination process.

If the pagination image in the fifth column of the first row is the second subject pagination image, the controller 5 changes the position in the matrix of a pagination image extracted from a piece of original document image data of the original document D in or before the fifth place in the reading order to the position immediately before the current position. As an example, the position of a pagination image corresponding to a pagination "4" (that is to say, the pagination image, which is located in the fourth column of the first row before the second change process) is changed to the position in the third column of the first row. The position of a pagination image corresponding to a pagination "2" (that is to say, the pagination image, which is located in the second column of the first row before the second change process) is changed to the position in the first column of the first row.

In addition, if the pagination image in the fifth column of the first row is the second subject pagination image, the controller 5 changes the position in the matrix of the pagination image in the fifth column of the first row to the position immediately before the current position. In other words, the position of the pagination image in the fifth column of the first row is changed to the position in the fourth column of the first row.

In the matrix illustrated in the upper portion of FIG. 15, the pagination images to be displaced are each enclosed with a solid line circle. The destinations of the pagination images to be displaced are indicated with solid line arrows.

If the first row is set as the second check row, a pagination image that comes off the matrix (that is to say, is nowhere to be displaced) when the second change process is executed is deleted. In the example illustrated in FIG. 15, a pagination image corresponding to a pagination "1" (the pagination image, which is located in the first column of the first row before the second change process) is deleted.

During the execution of the second change process, the controller 5 sets the current position in the matrix of the second subject pagination image as a second copy position. After changing the position of the second subject pagination image from the second copy position in the second change process, the controller 5 copies a pagination image of the reference row that is located in the column including the second copy position (position in the matrix of the second subject pagination image before the second change process), into the second copy position.

In the example illustrated in FIG. 15, the pagination image in the fifth column of the second row (pagination image corresponding to the pagination "16") is copied in the fifth column of the first row. In the matrix illustrated in the upper portion of FIG. 15, the pagination image as a copy source is enclosed with a broken line circle, and the copy destination is indicated with a broken line arrow. By means of the second change process as above, the matrix illustrated in the upper portion of FIG. 15 is changed into the matrix illustrated in the lower portion of FIG. 15.

After executing the second change process once, the controller 5 executes a second condition determination process for determining whether or not a second condition is satisfied. In the second condition determination process, the controller 5 determines that the second condition is satisfied if determining that the last-digit image in a pagination image of the reference row that is located in the column including the current position (position after the second change process) of the second subject pagination image and the last-digit image in the second subject pagination image are the same. If determining, in the second condition determination process after executing the second change process once, that the second condition is satisfied, the controller 5 determines that one original document D has been superposed on the second original document D.

Whether or not the last-digit image in a pagination image of the reference row that is located in the column including the current position of the second subject pagination image and the last-digit image in the second subject pagination image are the same (whether or not the second condition is satisfied) may be determined by compositing a pagination image of the reference row that is located in the column including the current position of the second subject pagination image and the second subject pagination image to generate composite image data, and determining whether or not the number of pixels of the difference region in a black pixel region that corresponds to the ones place and is detected from the generated composite image data is equal to or larger than the threshold. In other words, it may be determined that the last-digit image in a pagination image of the reference row that is located in the column including the current position of the second subject pagination image and the last-digit image in the second subject pagination image are the same if the number of pixels of the difference region is smaller than the threshold, and it may be determined that the last-digit image in a pagination image of the reference row that is located in the column including the current position of the second subject pagination image and the last-digit image in the second subject pagination image are different from each other if the number of pixels of the difference region is equal to or larger than the threshold.

In the storage unit 6, a second count value indicating the number of times the second change process has been executed is stored. The controller 5 resets the second count value (that is to say, sets the second count value to zero) before starting a job involving the reading of conveyed documents. The controller 5 increases the second count value by one every time the controller 5 executes the second change process.

The controller 5 increases the second count value by one when executing the second change process for the first time. If determining in the second condition determination process after executing the second change process once that the second condition is not satisfied, the controller 5 repeats the second change process until determining that the second condition is satisfied. The controller 5 determines that the original documents D, whose number is equivalent to the second count value when the controller 5 determines that the second condition is satisfied, have been superposed on the second original document D.

In the example illustrated in FIG. 15, the second change process is executed based on the determination that a pagination image corresponding to the pagination "5" (the pagination image in the fifth column of the first row) is the second subject pagination image. After the second change process was executed once, the pagination image corresponding to the pagination "5" is displaced into the fourth column of the first row. On the other hand, in the fourth column of the second row (the fourth column of the reference row), a pagination image corresponding to a pagination "15" is located.

As a result, it is determined that the last-digit image in a pagination image of the reference row that is located in the column including the current position of the second subject pagination image and the last-digit image in the second subject pagination image are the same. In other words, it is determined that the second condition is satisfied. After the second change process was executed once, the second count value is changed to one, so that it is determined that one original document D has been superposed on the second original document D.

As another example, it is assumed that, apart from the original document D on page 6 (the original document D, to which the pagination "6" is imparted), the original document D on page 7 (the original document D, to which a pagination "7" is imparted) has been superposed on the original document D on page 5 (the original document D, to which the pagination "5" is imparted). In that case, a matrix illustrated in FIG. 16 is formed.

In the example illustrated in FIG. 16, it is determined that the pagination image corresponding to the pagination "5" is the second subject pagination image. The pagination image corresponding to the pagination "16" is located in the fourth column of the second row (the fourth column of the reference row). In consequence, in the second condition determination process after the second change process was executed once, it is not determined that the second condition is satisfied.

When the second change process is executed again after the first execution of the second condition determination process (that is to say, when the second change process is executed twice in total), the pagination image corresponding to the pagination "5" is displaced into the third column of the first row. In the third column of the second row (the third column of the reference row), the pagination image corresponding to the pagination "15" is located. Consequently, in the second condition determination process after the second change process was executed twice, it is determined that the second condition is satisfied. After the second change process was executed twice, the second count value is changed to two, so that it is determined that two original documents D have been superposed on the second original document D.

After the second number decision process (that is to say, after the controller 5 determines that the second condition is satisfied), the processing proceeds to step S30. In step S30, the controller 5 resumes the second determination process from the position immediately before the position of the second subject pagination image after the second change process. Subsequently, the processing proceeds to step S23.

In the example illustrated in FIG. 15, the second determination process is resumed from the third column of the first row (the third column of the second check row) of the matrix illustrated in the lower portion of FIG. 15. The arraying order of the pagination images in the matrix has been changed by executing the second change process. In the matrix after the second change process, the last-digit image in each pagination image of the first row (the second check row) is the same as the last-digit image in the pagination image in the identical column of the second row (the reference row). Therefore, after the second determination process is resumed, it is not determined that a pagination image of the first row is the second subject pagination image.

Although not illustrated, if the second row is set as the second check row in the second determination process, the second row is set as a new reference row and the first row is set as a new second check row after the second determination process on the second row. Then, the second determination process is continued (the second determination process is executed on the first row).

In the present embodiment, the controller 5 arrays a plurality of pagination images in the reading order of the original documents D corresponding to the original document image data as an extraction source of the pagination images, with the reading order beginning with the original document D earliest read, to form a matrix with n rows and ten columns. As a result, such matrices as illustrated in FIGS. 9 through 11 are formed.

If multi feed has not occurred during the execution of the reading of conveyed documents (see FIG. 9), the last-digit images in the pagination images in the identical column of the respective rows are the same.

In contrast, if multi feed has occurred during the execution of the reading of conveyed documents (see FIGS. 10 and 11), a pagination image corresponding to the original document D, which has been superposed on another original document D, does not appear in the matrix. Consequently, the last-digit images in the pagination images of the respective rows are not the same in some column or another of the matrix.

In view of the above, the controller 5 sets the reference row and the first check row as well to execute the first determination process. If the reference row as initially set is not the first row, the controller 5 sets the second check row to execute the second determination process in addition to the first determination process. The controller 5 executes the first determination process on the pagination images in respective columns of the first check row to determine, in order from the first column, whether or not a pagination image of the first check row is the first subject pagination image, which differs in last-digit image from the pagination image in the identical column of the reference row. On the other hand, the controller 5 executes the second determination process on the pagination images in respective columns of the second check row to determine, in order from the tenth column, whether or not a pagination image of the second check row is the second subject pagination image, which differs in last-digit image from the pagination image in the identical column of the reference row.

If multi feed has occurred, a pagination image differing in last-digit image from the pagination image in the identical column of the reference row appears in the first check row. Also in the second check row, a pagination image differing in last-digit image from the pagination image in the identical column of the reference row appears. Thus, the configuration, in which the controller 5 executes the first determination process, allows the multifunction peripheral 100 to automatically determine whether or not multi feed has occurred. The configuration, in which the controller 5 executes the second determination process, also allows the multifunction peripheral 100 to automatically determine whether or not multi feed has occurred.

That ten different last-digit images are included in a row of the matrix refers to that ten original documents D, from the original document D corresponding to a pagination image in the first column of the row to the original document D corresponding to a pagination image in the tenth column of the row, have regularly been read (that is to say, have been read in order of page number without multi feed). The controller 5 sets a row including ten different last-digit images as a reference row, which allows the suppression of errors in determining whether or not multi feed has occurred.

The controller 5 executes the first change process and the first condition determination process. The controller 5 executes the first condition determination process once every time the controller 5 executes the first change process once. The controller 5 executes the second change process and the second condition determination process if the second determination process is to be executed. The controller 5 executes the second condition determination process once every time the controller 5 executes the second change process once.

If the reading has been performed with one original document D having been superposed on some original document D, the first condition is satisfied by displacing the first subject pagination image one position after in the matrix, as illustrated in FIG. 13. Although not illustrated, if the reading has been performed with two original documents D having been superposed on some original document D, the first condition is satisfied by displacing the first subject pagination image two positions after in the matrix. In other words, that it is determined, in the first condition determination process after the first change process was executed N times, that the first condition is satisfied refers to that N original documents D have been superposed on some original document D.

Furthermore, if the reading has been performed with one original document D having been superposed on some original document D, the second condition is satisfied by displacing the second subject pagination image one position before in the matrix, as illustrated in FIG. 15. If the reading has been performed with two original documents D having been superposed on some original document D, the second condition is satisfied by displacing the second subject pagination image two positions before in the matrix, as illustrated in FIG. 16. In other words, that it is determined, in the second condition determination process after the second change process was executed N times, that the second condition is satisfied refers to that N original documents D have been superposed on some original document D.

If determining that some pagination image or another of the first check row is the first subject pagination image, the controller 5 decides the number of original documents D having been superposed on the first original document D based on the first count value indicating the number of times the first change process has been executed. If determining that some pagination image or another of the second check row is the second subject pagination image, the controller 5 decides the number of original documents D having been superposed on the second original document D based on the second count value indicating the number of times the second change process has been executed. In other words, the controller 5 not only determines whether or not multi feed has occurred but how many original documents D have been superposed on one another if multi feed has occurred.

Multi feed may occur two or more times in one job. Therefore, after changing the position of the first subject pagination image from the first copy position in the first change process, the controller 5 copies a pagination image of the reference row that is located in the column including the first copy position, into the first copy position and resumes the first determination process from the position immediately after the position of the first subject pagination image after the first change process. After the termination of the first determination process on the first check row, the controller 5 sets the first check row as a new reference row and a row after the new reference row as a new first check row to continue the first determination process, if any rows follow the first check row.

In addition, after changing the position of the second subject pagination image from the second copy position in the second change process, the controller 5 copies a pagination image of the reference row that is located in the column including the second copy position, into the second copy position and resumes the second determination process from the position immediately before the position of the second subject pagination image after the second change process. After the termination of the second determination process on the second check row, the controller 5 sets the second check row as a new reference row and a row after the new reference row as a new second check row to continue the second determination process, if any rows precede the second check row.

Description is now made on the skipping over function, which is provided on the multifunction peripheral 100. In the description below, the number of original documents D having been superposed on some original document D is referred to as "the number of multi-fed documents".

A process related to the skipping over function (hereinafter referred to as "skipping over process") is executed by the controller 5. If detecting the occurrence of multi feed in the process of executing a job involving the reading of conveyed documents, the controller 5 stores, in the storage unit 6, multi feed information containing the frequency value, which indicates during which reading (that is to say, during the reading of which document) multi feed has occurred, in order to execute the skipping over process. The controller 5 includes the number of multi-fed documents in the multi feed information.

After the termination of the reading of conveyed documents, the controller 5 causes the operation panel 4 to make notification for urging to reread the original document D if already detecting the occurrence of multi feed. The operation panel 4 displays a multi feed notification message notifying that multi feed has occurred. The operation panel 4 includes, in the multi feed notification message, a message urging to stack all the original documents D to be read in order of page number and set the stacked original documents D again on the original document conveyance unit 2. The operation panel 4 also includes, in the multi feed notification message, a message urging to press the start button after setting the original documents D again.

The user, who has read the multi feed notification message on the operation panel 4, newly sets the bundle of original documents D, which is located on the original document discharging tray 202, on the original document setting tray 201. Then, the user presses the start button of the operation panel 4.

The controller 5 starts the reading of conveyed documents by the image reading section 1 if detecting an operation on the start button in the process of the display of the multi feed notification message by the operation panel 4 (after the reading of conveyed documents, during which it is determined that multi feed has occurred, was terminated). The controller 5 stops the display of the multi feed notification message by the operation panel 4 if detecting an operation on a reset button of the operation panel 4 in the process of the display of the multi feed notification message by the operation panel 4. If the start button is pressed in the state where the display of the multi feed notification message is stopped, the skipping over process is not executed.

If detecting an operation on the start button in the state where the multi feed notification message is displayed, the controller 5 executes the skipping over process. Specifically, the controller 5 acquires multi feed information on the latest reading of conveyed documents (the reading of conveyed documents, during which multi feed has occurred) and recognizes the frequency value and the number of multi-fed documents both contained in the acquired multi feed information. The controller 5 sets the frequency value contained in the acquired multi feed information as a pass over frequency value.

Thereafter, the controller 5 causes the original document conveyance unit 2 to start feeding and conveying of the bundle of original documents D. The controller 5 increases a feeding count value indicating the number of times the original document D has been fed, by one every time one original document D is fed to the original document conveyance path P from the original document setting tray 201. The feeding count value is stored in the storage unit 6. When a job involving the reading of conveyed documents is terminated, the controller 5 resets the feeding count value.

The controller 5 does not start the reading by the image reading section 1 until the feeding count value exceeds the pass over frequency value. The controller 5 starts the reading by the image reading section 1 when the feeding count value exceeds the pass over frequency value. The image reading section 1 performs the reading beginning with the original document D, which has been fed when the feeding count value exceeds the pass over frequency value.

After the reading by the image reading section 1 is started, the controller 5 determines whether or not the number of the original documents D as read by the image reading section 1 (the number of original documents D having gone through the reading position RP) has reached the number of multi-fed documents. When the number of read original documents D has reached the number of multi-fed documents, the controller 5 terminates the reading of original documents D by the image reading section 1.

Even if terminating the reading of original documents D by the image reading section 1, the controller 5 continues the feeding and conveying of original documents D by the original document conveyance unit 2. In other words, the original document D is passed over after the number of read original documents D has reached the number of multi-fed documents.

In the example illustrated in FIG. 13, multi feed has occurred during the 25th reading (the reading of the original document D, to which the pagination "25" is imparted), so that the pass over frequency value is set to 25. Therefore, when the reading of conveyed documents is performed again, the original documents D, to which the paginations "1" through "25" are imparted, respectively, are passed over. Thereafter, the original document D, to which the pagination "26" is imparted, is read if further multi feed has not occurred.

In addition, the number of multi-fed documents is one in the example illustrated in FIG. 13. Therefore, the original documents D, to which the paginations "27" through "40" are imparted, respectively, are not read after the original document D with the pagination "26" is read.

Thus, the skipping over function makes it possible to only read the original document D having been superposed on some original document D. The skipping over function as such is convenient for the user because, if the multi feed notification message is displayed on the operation panel 4, the unread original document D is solely read just as long as the user takes out a bundle of original documents D from the original document discharging tray 202, sets the taken out bundle again on the original document setting tray 201, and presses the start button without checking which original document D has not been read.

The multifunction peripheral 100 is able to perform double-sided reading, so that, in some cases, a plurality of original documents D each having paginations on both faces are set on the original document conveyance unit 2.

As an example, it is assumed that a plurality of original documents D, including the original document D (denoted here by $D_{11-12}$) having a pagination "11" on the front face and a pagination "12" on the back face, the original document D (denoted here by $D_{13-14}$) having a pagination "13" on the front face and a pagination "14" on the back face, the original document D (denoted here by $D_{15-16}$) having the pagination "15" on the front face and the pagination "16" on the back face, and the original document D (denoted here by $D_{17-18}$) having the pagination "17" on the front face and the pagination "18" on the back face, are subjected to double-sided reading.

If multi feed has occurred that makes the original document $D_{15-16}$ superposed on the original document $D_{13-14}$, a matrix illustrated in FIG. 17 is formed. If the original document $D_{15-16}$ was missing from the beginning (that is to say, the original document $D_{15-16}$ was not included in the bundle of original documents D as set on the original document conveyance unit 2), a matrix illustrated in FIG. 18 is formed.

In the examples illustrated in FIGS. 17 and 18, the first row is set as a reference row, so that the second determination process is not executed.

In the example illustrated in FIG. 17, the controller 5 determines, during the execution of the first determination process on the second row, that the pagination image in the fourth column of the second row is the first subject pagination image. In other words, the controller 5 recognizes the front face of the original document $D_{13-14}$, which front face corresponds to the piece of original document image data as an extraction source of the pagination image in the third column of the second row, as the first original document D. In the example illustrated in FIG. 17, the first original document D is thirteenth (that is to say, in an odd-numbered place) in the reading order.

In the example illustrated in FIG. 18, the controller 5 determines, during the execution of the first determination process on the second row, that the pagination image in the fifth column of the second row is the first subject pagination image. In other words, the controller 5 recognizes the back face of the original document $D_{13-14}$, which back face corresponds to the piece of original document image data as an extraction source of the pagination image in the fourth column of the second row, as the first original document D. In the example illustrated in FIG. 18, the first original document D is fourteenth (that is to say, in an even-numbered place) in the reading order.

As another example, it is assumed that a plurality of original documents D, including the original document D (denoted here by $D_{1-2}$) having the pagination "1" on the front face and the pagination "2" on the back face, the original document D (denoted here by $D_{3-4}$) having a pagination "3" on the front face and the pagination "4" on the back face, the original document D (denoted here by $D_{5-6}$) having the pagination "5" on the front face and the pagination "6" on the back face, and the original document D (denoted here by $D_{7-8}$) having the pagination "7" on the front face and a pagination "8" on the back face, are subjected to double-sided reading.

If multi feed has occurred that makes the original document $D_{5-6}$ superposed on the original document $D_{3-4}$, a matrix illustrated in FIG. 19 is formed. If the original document $D_{5-6}$ was missing from the beginning (that is to say, the original document $D_{5-6}$ was not included in the bundle of original documents D as set on the original document conveyance unit 2), a matrix illustrated in FIG. 20 is formed.

In the examples illustrated in FIGS. 19 and 20, the second row is set as a reference row, and the second determination process on the first row is executed.

In the example illustrated in FIG. 19, the controller 5 determines, during the execution of the second determination process on the first row, that the pagination image in the third column of the first row is the second subject pagination image. In other words, the controller 5 recognizes the front face of the original document $D_{3-4}$, which front face corresponds to the piece of original document image data as an extraction source of the pagination image in the third column of the first row, as the second original document D. In the example illustrated in FIG. 19, the second original document D is third (that is to say, in an odd-numbered place) in the reading order.

In the example illustrated in FIG. 20, the controller 5 determines, during the execution of the second determination process on the first row, that the pagination image in the fourth column of the first row is the second subject pagination image. In other words, the controller 5 recognizes the back face of the original document $D_{3-4}$, which back face corresponds to the piece of original document image data as an extraction source of the pagination image in the fourth column of the first row, as the second original document D. In the example illustrated in FIG. 20, the second original document D is fourth (that is to say, in an even-numbered place) in the reading order.

As illustrated in FIGS. 17 through 20, in the case of double-sided reading, some pagination image or another of the first check row can be the first subject pagination image even if multi feed has not occurred. In addition, some pagination image or another of the second check row can be the second subject pagination image.

If the reading by the image reading section 1 is double-sided reading, the controller 5 determines whether the first original document D is in an odd-numbered place or an even-numbered place in the reading order. If the first original document D is in an odd-numbered place in the reading order, the controller 5 determines that multi feed has occurred. If the first original document D is in an even-numbered place in the reading order, the controller 5 determines that multi feed has not occurred.

If the reading by the image reading section 1 is double-sided reading, moreover, the controller 5 determines whether the second original document D is in an odd-numbered place or an even-numbered place in the reading order. If the second original document D is in an odd-numbered place in the reading order, the controller 5 determines that multi feed has occurred. If the second original document D is in an even-numbered place in the reading order, the controller 5 determines that multi feed has not occurred.

If the reading by the image reading section 1 is double-sided reading, the controller 5 displays the multi feed notification message on the operation panel 4 only if determining that multi feed has occurred. In other words, the multi feed notification message is not displayed on the operation panel 4 if the original document D, which should properly be read, was missing from the bundle of original documents D.

In the case where some original document D was missing from a bundle of original documents D, it is not possible to read the missing original document D even if the bundle of original documents D is set again and the reading is performed. The rereading is thus useless. For this reason, it is preferable to display the multi feed notification message only if the first original document D (the second original document D) is in an odd-numbered place in the reading order.

It should be considered that the embodiment as disclosed herein is illustrative in all respects and in no way limitative. The scope of the present disclosure is not defined by the description on the embodiment but by the claims and embraces all the modifications, which are equivalent in gist and scope to the claims.

What is claimed is:
1. An image forming apparatus comprising:
  an original document conveyance section configured to sequentially convey original documents set toward a reading position;
  an image reading section configured to sequentially read the original documents conveyed to the reading position; and a controller configured to sequentially acquire original document image data obtained upon reading of the original documents by the image reading section, wherein the controller:

extracts a pagination image including an image corresponding to a pagination imparted to an original document from the original document image data of each of a plurality of original documents read by the image reading section, and specifies a last-digit image in the pagination image for each pagination image, the last-digit image corresponding to a ones place of the pagination;

arrays a plurality of pagination images in a reading order of original documents corresponding to the original document image data as an extraction source of the plurality of pagination images, the reading order beginning with an original document earliest read, to form a matrix with n rows and ten columns;

sets one row of the matrix that includes ten different last-digit images as a reference row;

sets a row after the reference row as a first check row;

starts a first determination process on pagination images in respective columns of the first check row, the first determination process being for determining, in order from a first column, whether or not a pagination image of the first check row is a first subject pagination image that differs in last-digit image from a pagination image in an identical column of the reference row; and if determining that one of the pagination images of the first check row is the first subject pagination image, determines that multi feed has occurred during reading of a first original document that is an original document last read before an original document corresponding to the original document image data as an extraction source of the first subject pagination image.

2. The image forming apparatus according to claim 1, wherein, if determining that one of the pagination images of the first check row is the first subject pagination image, the controller:

stops the first determination process;

executes a first change process for changing a position of a pagination image after the first subject pagination image in the matrix to a position immediately after a current position and changing a position of the first subject pagination image to a position immediately after a current position;

after executing the first change process, executes a first condition determination process for determining whether or not a first condition is satisfied;

determines in the first condition determination process that the first condition is satisfied if determining that the last-digit image in a pagination image of the reference row that is located in a column including a current position of the first subject pagination image and the last-digit image in the first subject pagination image are identical to each other; and if determining in the first condition determination process after executing the first change process once that the first condition is satisfied, determines that one original document has been superposed on the first original document.

3. The image forming apparatus according to claim 2, wherein the controller resets, before starting a job involving the reading of the original documents, a first count value indicating a number of times the first change process has been executed, and increases the first count value by one every time the controller executes the first change process after starting the job, and if determining in the first condition determination process after executing the first change process once that the first condition is not satisfied, the controller repeats the first change process until determining that the first condition is satisfied, and determines that original documents, whose number is equivalent to a first count value when the controller determines that the first condition is satisfied, have been superposed on the first original document.

4. The image forming apparatus according to claim 2, wherein the controller resumes the first determination process after determining that the first condition is satisfied, starting from a position immediately after a current position of the first subject pagination image.

5. The image forming apparatus according to claim 4, wherein the controller sets a current position of the first subject pagination image as a first copy position when executing the first change process and, after changing the position of the first subject pagination image from the first copy position in the first change process, copies a pagination image of the reference row that is located in a column including the first copy position, into the first copy position, and after the first determination process on the first check row, the controller sets the first check row as a new reference row and a row after the new reference row as a new first check row to continue the first determination process, if any rows follow the first check row.

6. The image forming apparatus according to claim 1, wherein when performing double-sided reading, the image reading section reads a face on one side of an original document, then reads a face opposite with the face on one side of the original document, and if determining that one of the pagination images of the first check row is the first subject pagination image when the double-sided reading is performed, the controller determines that the multi feed has occurred if the first original document is in an odd-numbered place in reading order, and determines that the multi feed has not occurred if the first original document is in an even-numbered place in reading order.

7. The image forming apparatus according to claim 1, wherein, if initially setting a second row or a row after the second row of the matrix as the reference row, the controller:

sets a row before a first reference row as a second check row;

starts a second determination process on pagination images in respective columns of the second check row, the second determination process being for determining, in order from a tenth column, whether or not a pagination image of the second check row is a second subject pagination image that differs in last-digit image from a pagination image in an identical column of the reference row; and if determining that one of the pagination images of the second check row is the second subject pagination image, determines that the multi feed has occurred during reading of a second original document that is an original document corresponding to the original document image data as an extraction source of the second subject pagination image.

8. The image forming apparatus according to claim 7, wherein, if determining that one of the pagination images of the second check row is the second subject pagination image, the controller:
- stops the second determination process;
- executes a second change process for changing a position of a pagination image before the second subject pagination image in the matrix to a position immediately before a current position and changing a position of the second subject pagination image to a position immediately before a current position;
- after executing the second change process, executes a second condition determination process for determining whether or not a second condition is satisfied;
- determines in the second condition determination process that the second condition is satisfied if determining that the last-digit image in a pagination image of the reference row that is located in a column including a current position of the second subject pagination image and the last-digit image in the second subject pagination image are identical to each other; and
- if determining in the second condition determination process after executing the second change process once that the second condition is satisfied, determines that one original document has been superposed on the second original document.

9. The image forming apparatus according to claim 8, wherein
- the controller resets, before starting a job involving the reading of the original documents, a second count value indicating a number of times the second change process has been executed, and increases the second count value by one every time the controller executes the second change process after starting the job, and
- if determining in the second condition determination process after executing the second change process once that the second condition is not satisfied, the controller repeats the second change process until determining that the second condition is satisfied, and determines that original documents, whose number corresponds to a second count value when the controller determines that the second condition is satisfied, have been superposed on the second original document.

10. The image forming apparatus according to claim 8, wherein the controller resumes the second determination process after determining that the second condition is satisfied, starting from a position immediately before a current position of the second subject pagination image.

11. The image forming apparatus according to claim 10, wherein
- the controller sets a current position of the second subject pagination image as a second copy position when executing the second change process and, after changing the position of the second subject pagination image from the second copy position in the second change process, copies a pagination image of the reference row that is located in a column including the second copy position, into the second copy position, and
- after the second determination process on the second check row, the controller sets the second check row as a new reference row and a row before the new reference row as a new second check row to continue the second determination process, if any rows precede the second check row.

12. The image forming apparatus according to claim 7, wherein
- when performing double-sided reading, the image reading section reads a face on one side of an original document, then reads a face opposite with the face on one side of the original document, and
- if determining that one of the pagination images of the second check row is the second subject pagination image when the double-sided reading is performed, the controller determines that the multi feed has occurred if the second original document is in an odd-numbered place in reading order, and determines that the multi feed has not occurred if the second original document is in an even-numbered place in reading order.

* * * * *